US009420229B2

(12) United States Patent
Pourashraf et al.

(10) Patent No.: US 9,420,229 B2
(45) Date of Patent: Aug. 16, 2016

(54) SYSTEM AND METHOD FOR MANAGING MULTIMEDIA DATA

(71) Applicant: Smart Internet Technology CRC Pty Ltd, Eveleigh (AU)

(72) Inventors: Pedram Pourashraf, Fair Meadow (AU); Farzad Safaei, Mount Keira (AU)

(73) Assignee: Smart Internet Technology CRC Pty Ltd, Eveleigh (AU)

( * ) Notice: Subject to any disclaimer, the term of this patent is extended or adjusted under 35 U.S.C. 154(b) by 0 days.

(21) Appl. No.: 14/148,006

(22) Filed: Jan. 6, 2014

(65) Prior Publication Data

US 2014/0267564 A1 Sep. 18, 2014

Related U.S. Application Data

(63) Continuation of application No. PCT/AU2012/000824, filed on Jul. 6, 2012.

(30) Foreign Application Priority Data

Jul. 7, 2011 (AU) ................................ 2011902706

(51) Int. Cl.
*H04N 7/15* (2006.01)
*G06T 15/20* (2011.01)
*G06N 3/00* (2006.01)

(52) U.S. Cl.
CPC ............... *H04N 7/157* (2013.01); *G06N 3/006* (2013.01); *G06T 15/20* (2013.01)

(58) Field of Classification Search
CPC ..................................................... H04N 7/157
USPC ....................... 345/419; 348/14.08, 43, 14.01;
382/118; 709/231, 204; 715/733, 734;
370/260; 705/1.1, 14.16, 14.53
See application file for complete search history.

(56) References Cited

U.S. PATENT DOCUMENTS

| | | | | |
|---|---|---|---|---|
| 6,215,498 | B1 * | 4/2001 | Filo | G06F 3/011 345/419 |
| 6,853,398 | B2 * | 2/2005 | Malzbender | A63F 13/12 348/14.08 |
| 7,480,727 | B2 * | 1/2009 | Domschitz | 709/231 |
| 7,797,168 | B2 * | 9/2010 | Kusumoto | G06Q 30/02 705/1.1 |
| 7,953,255 | B2 * | 5/2011 | Amento et al. | 382/118 |
| 8,243,116 | B2 * | 8/2012 | Qvarfordt | G06K 9/00335 348/14.01 |
| 8,441,475 | B2 * | 5/2013 | Hamilton, II | A63F 13/12 345/419 |
| 8,457,019 | B2 * | 6/2013 | Bonkowski | H04L 12/1827 370/260 |

(Continued)

OTHER PUBLICATIONS

Patent Examination Report No. 1 for Australian Application No. 2012278940, mailed Oct. 22, 2014.

(Continued)

*Primary Examiner* — Gerald Gauthier
(74) *Attorney, Agent, or Firm* — Fish & Richardson P.C.

(57) ABSTRACT

A networking system and method is disclosed in this specification. The system hosts a virtual environment that is populated with avatars. Each avatar displays a video stream of a corresponding user and defines a virtual view point that represents the user's perspective of the virtual environment. The system implements a method that comprises monitoring movement of the avatars within the virtual environment and capturing a media stream from the virtual view point of each avatar as a corresponding user navigates the virtual environment. The captured video stream is relayed to a user's local client and displayed to the user.

20 Claims, 18 Drawing Sheets

(56) References Cited

U.S. PATENT DOCUMENTS

| | | | |
|---|---|---|---|
| 8,629,866 B2* | 1/2014 | Betzler et al. | 345/419 |
| 9,111,285 B2* | 8/2015 | Amidon | G06N 3/006 |
| 2004/0128350 A1* | 7/2004 | Topfl | G06Q 10/10 709/204 |
| 2009/0063983 A1* | 3/2009 | Amidon et al. | 715/733 |
| 2010/0146395 A1* | 6/2010 | Reyes | H04L 12/282 715/734 |
| 2010/0153497 A1* | 6/2010 | Sylvain | H04N 7/15 709/204 |
| 2011/0221865 A1* | 9/2011 | Hyndman | 348/43 |
| 2014/0267564 A1* | 9/2014 | Pourashraf et al. | 348/14.08 |

OTHER PUBLICATIONS

International Search Report for International Application No. PCT/AU2012/000824, mailed Oct. 10, 2012.

Quax, P. et al, "Scalable transmission of avatar video streams in virtual environments", IEEE Conference on Multimedia and Expo, vol. 1 pp. 631-634, 2004. Jun. 30, 2004 Online, Retrieved from the internet Sep. 18, 2012, http://citeseerx.ist.psu.edu/viewdoc/download?doi=10.1.1.94.9467&rep=repl&type=pdf.

Quax, P. et al, "A multi-user framework supporting video-based avatars", NetGames '03 Proceedings of the 2nd workshop on NetWork and system support for games., pp. 137-147. May 22-23, 2003 Online, Retrieved from the internet Sep. 18, 2012, http://citeseerx.ist.psu.edu/viewdoc/download?doi=I 0.1.1.90.229&rep=rep 1&type=pdf.

Wikipedia "Hidden_surface_determination" Apr. 1, 2010. Online, Retrieved from the internet Sep. 18, 2012 http://web.archive.org/web/20 10040 l 0605 33/http ://en. wikipedia.org/wiki/Hidden surface detennination.

* cited by examiner

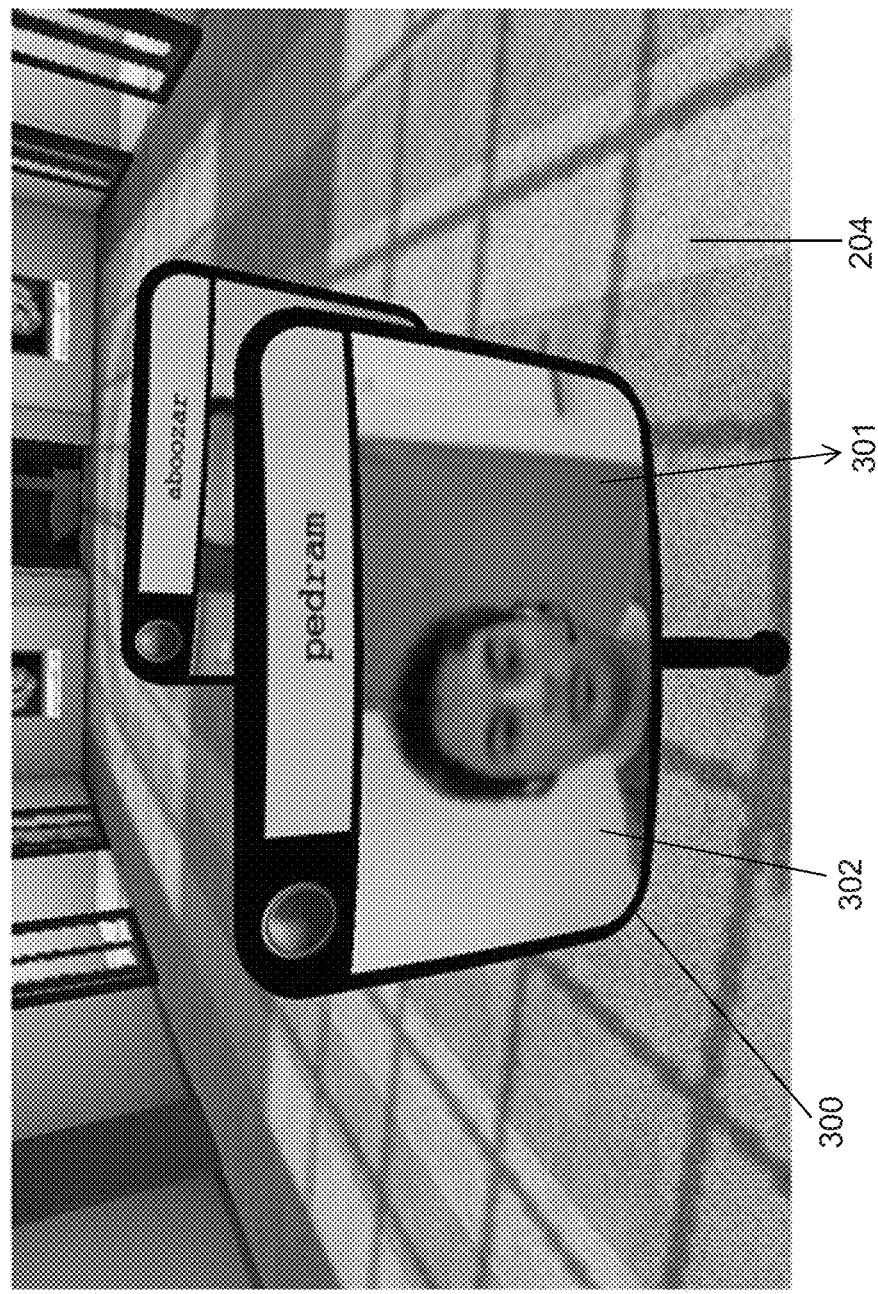

SYSTEM AND METHOD FOR MANAGING MULTIMEDIA DATA

FIELD OF THE INVENTION

The present invention relates to a system and method for managing multimedia data in a virtual environment.

BACKGROUND OF THE INVENTION

Traditional video conferencing systems are limited in the number of participants that can participate. Most limitations are attributable to the large amount of bandwidth required in order to transmit multimedia data to a large number of participants simultaneously.

The major bottleneck for such a system is the required network and server transmission capacity to support the service, which in the case of a traditional video conferencing system, grows in proportion to the square of the number of participants.

SUMMARY OF INVENTION

According to one aspect of the invention there is provided a networking method comprising:
  generating a virtual environment,
  populating the virtual environment with a plurality of avatars that each represent a corresponding user, each avatar displaying a video stream of the corresponding user and defining a virtual view point,
  facilitating movement of the avatars within the virtual environment, the movement of each avatar being controlled by the corresponding user,
  capturing a media stream from the virtual view point of each avatar as a corresponding user navigates the virtual environment, and
  displaying the captured media stream for each avatar to the corresponding user.

In another embodiment, the method comprises determining a line-of-sight for each avatar and generating the media stream displayed to the corresponding user based on the line-of-sights.

In another embodiment, the method comprises constructing the media stream for each avatar from a plurality of data culling techniques that are used to define an avatars line-of-sight.

In another embodiment, the method comprises constructing an avatars line-of-sight by applying any one or more of:
  (a) a back face culling technique;
  (b) a view field culling technique;
  (c) a visibility culling technique; and
  (d) an occlusion culling technique.

In another embodiment, the method comprises determining a virtual distance between avatars within the virtual environment and moderating the reproduction of an avatar's video stream in the media stream associated with another avatar based on the proximity of the respective avatars within the virtual environment.

In another embodiment, the method comprises reducing the bit rate and/or frame rate of the reproduced video stream for distant avatars.

In another embodiment, the method comprises generating a virtual display screen that displays images sourced from a client associated with an avatar within the virtual environment, the virtual display screen being visible within the virtual environment.

According to another aspect of the invention there is provided a networking system comprising:
  a server that hosts a virtual environment, the server being connected to a data network, and
  a plurality of user avatars stored in server memory and accessible through the data network, each user avatar displaying a video stream of a corresponding user and defining a virtual view point,
  the server documenting movement of the avatars within the virtual environment and defining a media stream that is captured from the virtual view point of each avatar and relayed to a corresponding user.

In another embodiment, the server determines a line-of-sight for each avatar within the virtual environment, the line-of-sight defining the media stream that is relayed to the corresponding user.

In another embodiment, the server directs the transmission of the video stream associated with each avatar based on the line-of-sight determined for the corresponding avatar, the video stream being transmitted directly between clients associated with the avatars.

In another embodiment, the server receives a video stream from a client associated with each avatar and relays the media stream for each avatar to a corresponding user based on the line-of-sight of the avatar.

In another embodiment, the server implements a plurality of data culling techniques to define an avatars line-of-sight.

In another embodiment, the server determines an avatars line-of-sight by applying any one or more of:
  (a) a back face culling technique;
  (b) a view field culling technique;
  (c) a visibility culling technique; and
  (d) an occlusion culling technique.

In another embodiment, the server determines a virtual distance between avatars within the virtual environment and moderates the reproduction of an avatar's video stream in the media stream associated with another avatar based on the proximity of the respective avatars within the virtual environment.

In another embodiment, the server reduces the bit rate and/or frame rate of the reproduced video stream for distant avatars.

In another embodiment, the server generates a virtual display screen that displays images sourced from a client associated with an avatar within the virtual environment, the virtual display screen being visible within the virtual environment.

According to another aspect of the invention there is provided a method of managing multimedia data in a virtual environment, comprising the steps of:
  determining one or more virtual clients that satisfy at least one pre-determined criterion;
  requesting multimedia data for the one or more virtual clients that meet the at least one pre-determined criterion; and
  receiving and displaying the multimedia data to one or more end clients.

In another embodiment the step of satisfying the pre-determined criterion includes the further step of applying at least one data culling technique to the one or more virtual clients.

In a further embodiment the data culling technique may be one or more of:
  (a) back face culling technique;
  (b) view field culling technique
  (c) a visibility culling technique; and
  (d) an occlusion culling technique.

In another embodiment the view field culling technique includes determining whether the one or more clients reside within a view field within the virtual environment.

In a further embodiment the method comprises the further step of defining the view field relative to the location of the one or more clients.

In a yet another embodiment the view field is defined as a geometric shape, the edges of the shape defining the limits of the view field of the one or more users.

In an additional embodiment the view field culling technique includes the further step of excluding all client that are not located within the view field.

In an additional embodiment the method comprises the step of defining a maximum range of visibility within the view field.

In another embodiment the visibility culling technique includes the further step of excluding all clients that are located beyond the maximum range of visibility.

In a further embodiment the back face culling technique step is performed after the application of the view field culling technique and the visibility culling technique.

In one more embodiment the occlusion culling technique step is performed after the visibility culling technique step and after back face culling technique step.

In another embodiment the occlusion culling technique the further steps of determining the distance of each one of the virtual clients in the view field relative to the one or more clients, defining a visible angle range for each one of the virtual clients, determining whether each one of the clients is occluded by another of the at least one of the clients, and excluding each one of the clients that are occluded.

In a further embodiment the method comprises the additional step of determining the virtual motion of the one or more clients.

A further embodiment of the method comprises the additional step of assigning a motion vector to each one of the one or more clients and each one of the one or more clients.

In another embodiment the motion vector includes a translational velocity vector and an angular velocity vector.

In another embodiment the motion includes a component which compensates for a network delay.

In a further embodiment the motion vector of the one or more clients is utilized to adjust the view field to determine a conservative view field.

In another embodiment the data culling techniques are performed based on the conservative view field.

According to another aspect of the invention there is provided a method of managing multimedia data in a virtual environment, the method of comprising the steps of:
  determining one or more virtual clients that satisfy at least one predetermined criterion;
  receiving a request for multimedia data for the one or more virtual clients that meet at least one pre-determined criterion; and
  providing the multimedia data to one or more virtual clients.

In another embodiment the step of satisfying the pre-determined criterion includes the further step of applying at least one data culling technique to the one or more virtual clients.

In another embodiment the data culling technique may be one or more of:
  (a) back face culling technique;
  (b) view field culling technique
  (c) a visibility culling technique; and
  (d) an occlusion culling technique.

In a further embodiment the view field culling technique includes determining whether the one or more clients reside within a view field within the virtual environment.

In another embodiment the method comprising the further step of defining the view field relative to the location of the one or more clients.

In another embodiment the view field is defined as a geometric shape, the edges of the shape defining the limits of the view field of the one or more clients.

In a further embodiment the view field culling technique includes the further step of excluding all clients that are not within the view field.

In a different embodiment the method comprising the step of defining a maximum range of visibility within the view field.

In yet another embodiment the visibility culling technique includes the further step of excluding all clients that are located beyond the maximum range of visibility.

In an additional embodiment the back face culling technique step is performed after the application of the visibility culling technique and the view field culling technique.

In yet another embodiment the occlusion culling technique step is performed after the view field culling technique, the visibility culling technique step and after back face culling technique step.

In a further embodiment the occlusion culling technique the further steps of determining the distance of each one of the virtual clients in the view field relative to the one or more clients, defining a visible angle range for each one of the virtual clients, determining whether each one of the clients is occluded by another of the at least one of the clients, and excluding each one of the clients that are occluded.

In another embodiment the method comprising the additional step of determining the virtual motion of the one or more clients.

In a further embodiment the method comprising the additional step of assigning a motion vector to each one of the one or more clients and each one of the one or more clients.

In an additional embodiment the motion vector includes a translational velocity vector and an angular velocity vector.

In a further embodiment the motion includes a component which compensates for a network delay.

In yet another embodiment the motion vector of the one or more clients is utilized to adjust the view field to determine a conservative view field.

In another embodiment the data culling techniques are performed based on the conservative view field.

According to a further aspect the invention there is provided a system for managing multimedia data in a virtual environment comprising:
  a central server
  one or more user devices arranged to communicate with the central server
  the central server arranged to create a virtual environment including clients related to the one or more users,
  the central server being arranged to:
  (a) determine if one or more virtual clients satisfy at least one predetermined criterion;
  (b) receive a request for multimedia data for the one or more virtual clients that meet at least one pre-determined criterion; and
  (c) providing the multimedia data to one or more virtual clients.

BRIEF DESCRIPTION OF THE FIGURES

In order to achieve a better understanding of the nature of the present invention embodiments will now be described, by way of example only, with reference to the accompanying figures in which:

FIG. 3b shows one form of an avatar in the virtual environment.

DETAILED DESCRIPTION OF EMBODIMENTS OF THE INVENTION

The present invention relates to a system and method for managing multimedia data, in particular for one or more entities in a virtual environment, comprising an interface for receiving instructions from a user and allowing a user to interact with the system and manage multimedia data. The system includes at least one processor for generating a virtual environment and managing multimedia data. In the following example embodiments, the interface and processor are implemented by a computer having an appropriate user interface. The computer may be implemented by any computing architecture, including a stand-alone PC, a client/server architecture, a "dumb" terminal/mainframe architecture, or any other appropriate architecture. The computing device is appropriately programmed to implement an embodiment of the invention.

Figure 1:
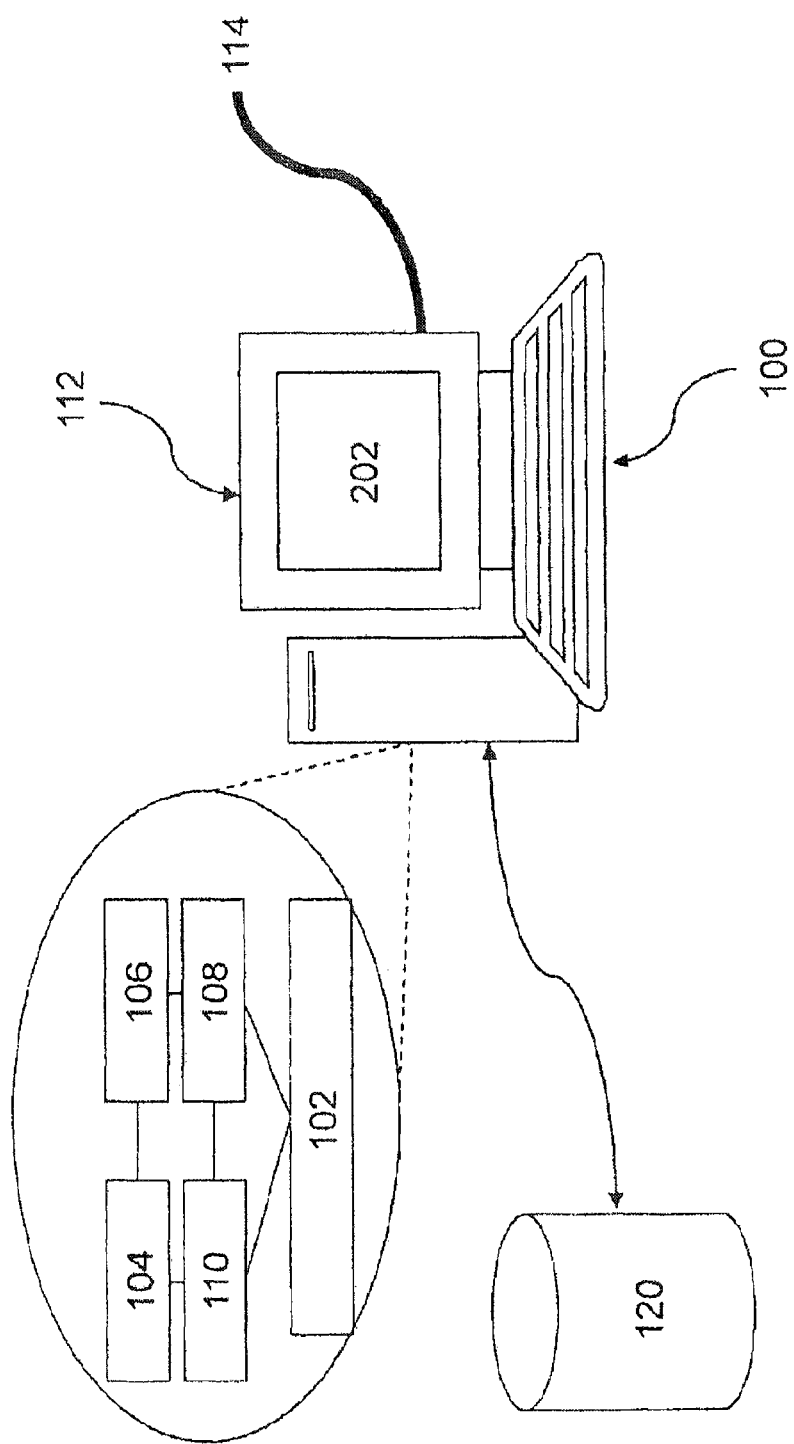
FIG. 1 is a schematic diagram of a general computing device upon which the system and method of the present invention may be implemented.

Referring to FIG. 1 there is shown a schematic diagram of a general computing device 100. The computing device 100 comprises suitable components necessary to receive, store and execute appropriate computer instructions. The components may include a processing unit 102, read-only memory (ROM) 104, random access memory (RAM) 106, and input/output devices such as disk drives 108, input devices 110 such as an Ethernet port, a USB port, etc. Display 112 such as a liquid crystal display, a light emitting display or any other suitable display and communications links 114. The server 100 includes instructions that may be included in ROM 104, RAM 106 or disk drives 108 and may be executed by the processing unit 102. There may be provided a plurality of communication links 114 which may variously connect to one or more computing devices such as a server, personal computers, terminals, wireless or handheld computing devices. At least one of a plurality of communications link may be connected to an external computing network through a telephone line or other type of communications link.

The service may include storage devices such as a disk drive 108 which may encompass solid state drives, hard disk drives, optical drives or magnetic tape drives. The server 100 may use a single disk drive or multiple disk drives. The server 100 may also have a suitable operating system 116 which resides on the disk drive or in the ROM of the server 100.

The device may include a database 120 residing on a disk or other storage device which is arranged to store data. The database 120 is in communication with an interface 202, which is implemented by computer software residing on the computing device 100. The interface 202 provides a means by which to communicate with a human user. In the specification reference to servers, processors, clients, user devices or computing devices are implemented using a computing device 100 described earlier.

Figure 2:
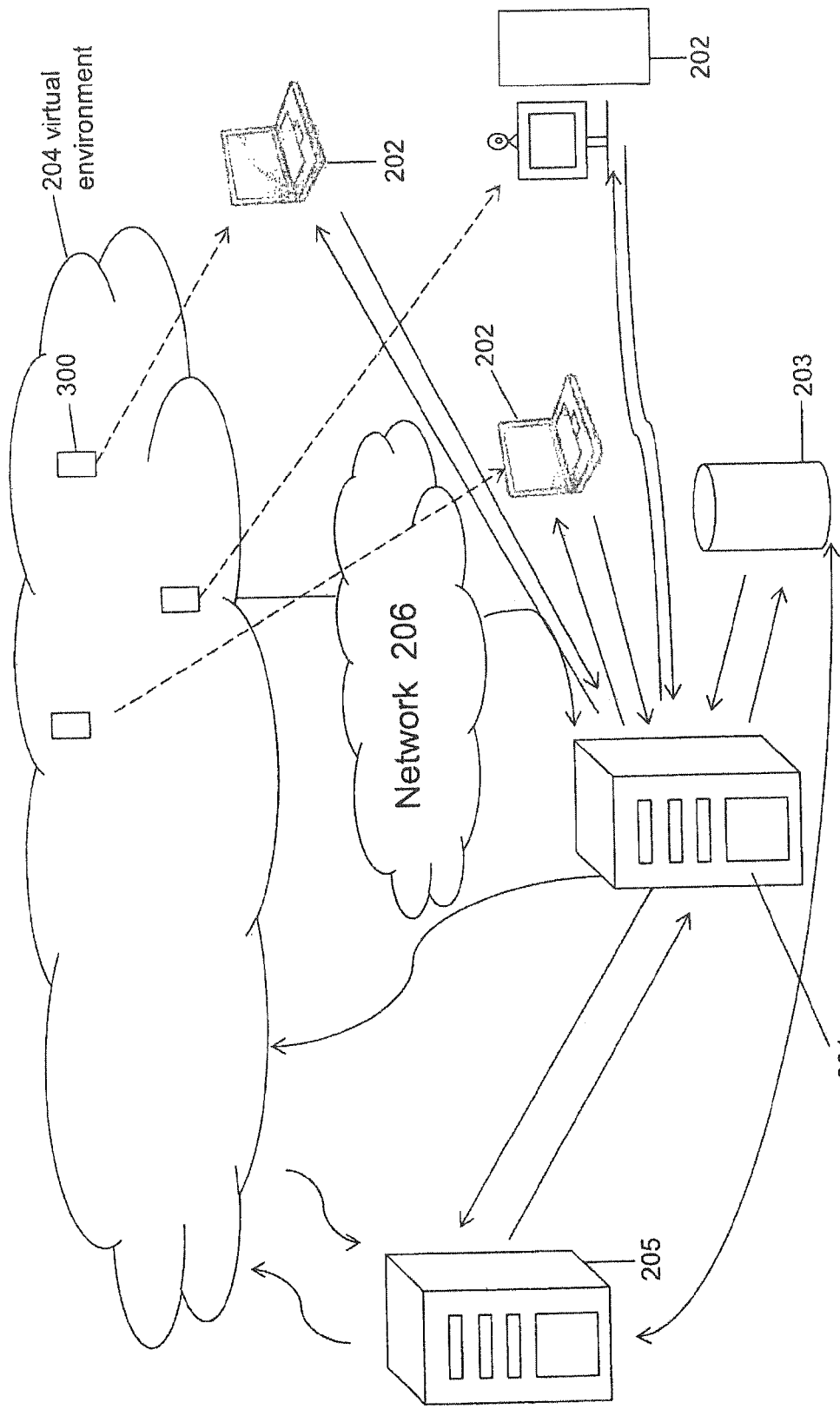
FIG. 2 is a schematic diagram of a system arranged for managing multimedia data in a virtual environment.

FIG. 2 shows a system diagram of a system for managing multimedia data. The system 200 includes a central server 201, at least one or more clients 202, a database 203 and a virtual environment 204 (described later). The system may comprise an optional media server 205. A communication network 206 allows communication between the various components of the system. The communication network may be any suitable network. The clients 202 and the central server 201 are implemented on a computing device 100 described earlier.

The clients 202 are adapted to communicate with the central server 201. The clients 202 are arranged to communicate with each other in the virtual environment 203 via the central server 201. The central server 201 creates the virtual environment and manages or controls the data flow to and from the virtual environment 204. The instructions regarding the contents of the virtual environment may be stored on the database 203, and can be accessed by the central server. In another form the system may include a further media server 205 that controls the media data sent to and from the virtual environment. The media server 205 is adapted to be in communication with the central server 201, and may in some forms be controlled by the central server. The media server 205 may be arranged to communicate with the database 203 also.

Figure 3A:
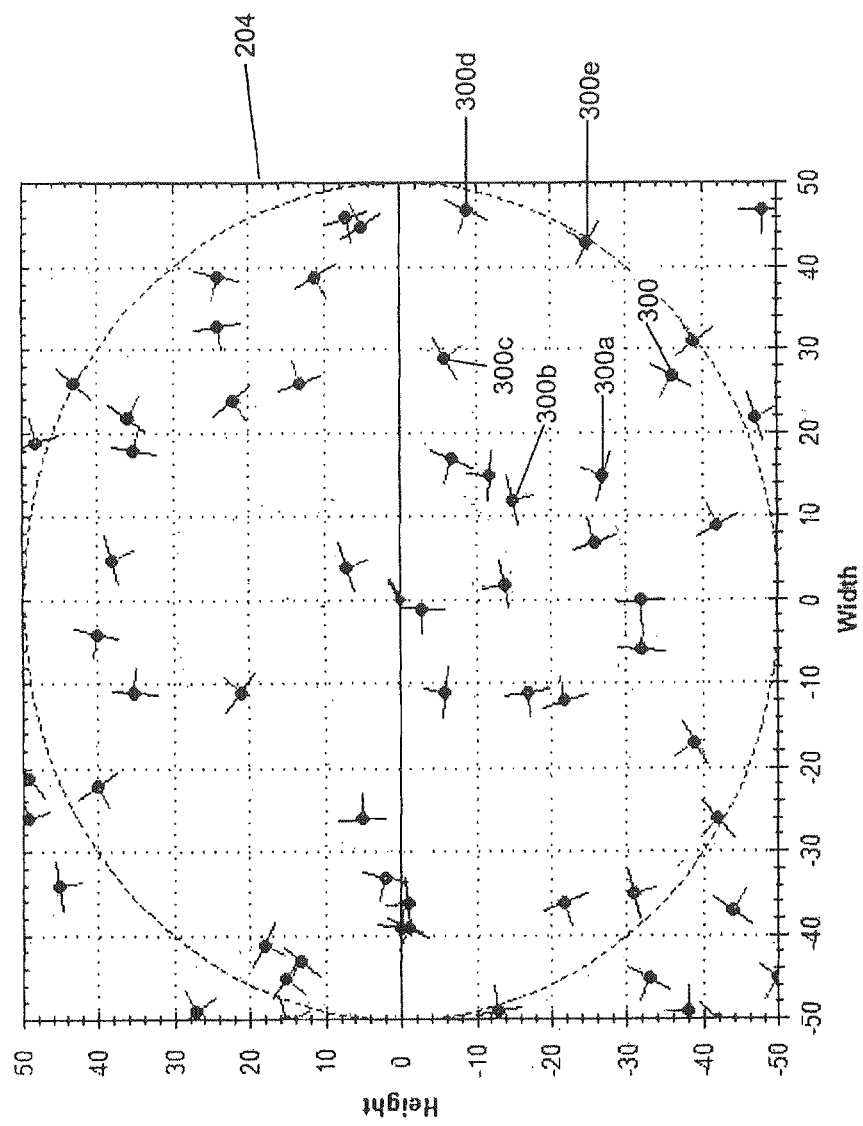
FIG. 3a is a schematic representation of a virtual environment with a plurality of avatars.

The central server 201 creates and manages a virtual environment 204. The virtual environment, in one form, is a 3D (three dimensional) environment adapted for video conferencing. FIG. 3a shows an image of the virtual environment with two avatars that each represent a corresponding client within the virtual environment. The figure shows a 2D (two dimensional) image of the virtual environment. There are a plurality of users and the users can interact with the virtual environment through the clients 202. The clients 202 may include a user interface such as a screen or display that allows a user to view the virtual environment and view and interact with other avatars in the virtual environment.

The database 203 stores instructions regarding the components of the virtual environment. The database may be arranged to store a plurality of different types of virtual environments. The database may include instructions or information regarding graphics, rendering, bounds, limits and objects that are common to all virtual environments. The database 203 can be accessed by the server 201 that uses information relating to a virtual environment to create the virtual environment 204. Once the virtual environment is created it can be populated with participants. The central server 201 receives information from the clients 202 that want to be positioned in the virtual environment as participants. The central server may process information from the database and the clients in order to create a virtual environment and populate the virtual environment with participants.

In another form the media server 205 receives instructions regarding creation of a virtual environment from the central server 201. The media server may access the database and use the stored information to create a virtual environment. The media server 205 may also receive instructions relating to the clients 202 from the central server 201. The media server 205 can process this information and populate the virtual environment with participants. In an alternate form the clients 202 may communicate with the media server 205 directly, the media server processing the information from the clients 202 and populating the virtual environment with participants. In this alternate form the media server may communicate directly with the database 203 to gather necessary information in order to create a virtual environment.

A networking system is illustrated in the Figures. The system illustrates a networking method that allows users to correspond with live video and audio streams.

The networking method comprises generating a virtual environment and populating the virtual environment with a plurality of avatars 300. The avatars 300 each represent a corresponding user. Each avatar 300 displays a video stream of the corresponding user that is displayed in the virtual environment. The avatars 300 also define a virtual view point from which the virtual environment is reproduce for the corresponding user.

Each user controls the movement of the corresponding avatar within the virtual environment. The movement of the avatars within the virtual environment is monitored by the central server 201. The server 201 also captures a media stream from the virtual view point of each avatar as users navigate the virtual environment. The captured media stream is displayed to the user on a corresponding local client (such as the user's personal computer).

The server 201 determines a line-of-sight for each avatar within the virtual environment. The media stream displayed to the corresponding user is generated based on the line-of-sight for the corresponding avatar. The server 201 may construct the media stream for each avatar from a plurality of data culling techniques that are disclosed later in this specification. The data culling techniques are used to define the avatars line-of-sight.

The server 201 ideally determines a virtual distance between avatars within the virtual environment. The virtual distance may be used to moderate the quality of the video stream relayed to a user's local client. Ideally, quality of an avatar's video stream (as reproduced in the media stream of another avatar) is based on the proximity of the respective avatars within the virtual environment. The server 201 may reduce the bit rate and/or frame rate of the reproduced video stream for distant avatars to moderate the video stream quality.

The server 201 may generate a virtual display screen that displays images sourced from a client (associated with an avatar within the virtual environment) in the virtual environment. The virtual display screen being visible within the virtual environment.

The illustrated networking system comprises a server that hosts a virtual environment and a plurality of user avatars stored in server memory. The server 201 is connected to a data network. The avatars are accessible through the data network. Each user avatar displays a video stream of a corresponding user. The avatars also define a virtual view point that dictates the perspective of the virtual environment that is relayed to a corresponding user. The server 201 documents movement of the avatars within the virtual environment and defines a media stream that is captured from the virtual view point of each avatar. The media stream is relayed to a corresponding user.

The server 201 determines a line-of-sight for each avatar within the virtual environment. The line-of-sight defines the media stream that is relayed to the corresponding user. The server 201 may direct the transmission of the video stream associated with each avatar (based on the corresponding line-of-sight) directly between clients associated with the avatars. Alternatively, the server 201 may receive the video stream associated with each avatar and relay the media stream for each avatar to a corresponding user's local client. This increases the bandwidth loading on the server 201 (as the server 201 receives a full video stream for each user client), but reduces the bandwidth loading on the individual clients (as the local clients only receive the video stream for other avatars that are within their line-of-sight).

The virtual environment may include a plurality of avatars 300a, 300b, 300c, 300d, etc. as seen in FIG. 3a. Each one of the avatars exist in the environment in the form of a simplified visual representation of the user. The avatar may take any suitable form and may be customisable to allow a user to create their own avatar. In one form, as shown in FIG. 3b, the avatar 301 includes a display 302. The display in one form is a live video feed. The video feed can be recorded and streamed live from a video recording device such as a camera that may be associated with the client 202. The video stream is transmitted to the central server 201 and then projected into the virtual environment as part of the avatar. In another form the video stream may be sent by the server 201 to the media server 205 which then transmits the information to the avatar in the virtual environment 204.

The clients 202 may be able to communicate with the virtual environment in order to control the avatar 300 associated with the client. The user can control the motion of the avatar 300 in the virtual environment. Avatars can move freely within the virtual environment and an avatar can interact with other avatars. The illustrated avatars display a corresponding user's multimedia data feed. User's can therefore communicate with other users in the virtual environment through their respective avatars. A user can speak directly to another user via the multimedia data feed of the other user's avatar.

The avatars also include a virtual camera 303 that receives multimedia data from other avatars. The multimedia data streams are transmitted either to the media server or the central server and then transmitted back to the end user associated with the avatar 300. The camera 302 allows the end user to view the virtual environment and the avatars of other users, and receive communication from the other users in the virtual environment through their respective avatars. The multimedia data stream can involve video and audio data, or simply video data or simply audio data.

In the specification the word avatar relates to a virtual representation of a user in the virtual environment. The avatar is an electronic representation of a user that can communicate with the network and system components described earlier. Where ever there is reference to an avatar performing an action it will be understood it is the client associated with that avatar that is performing that action in the physical world.

Figure 4A:
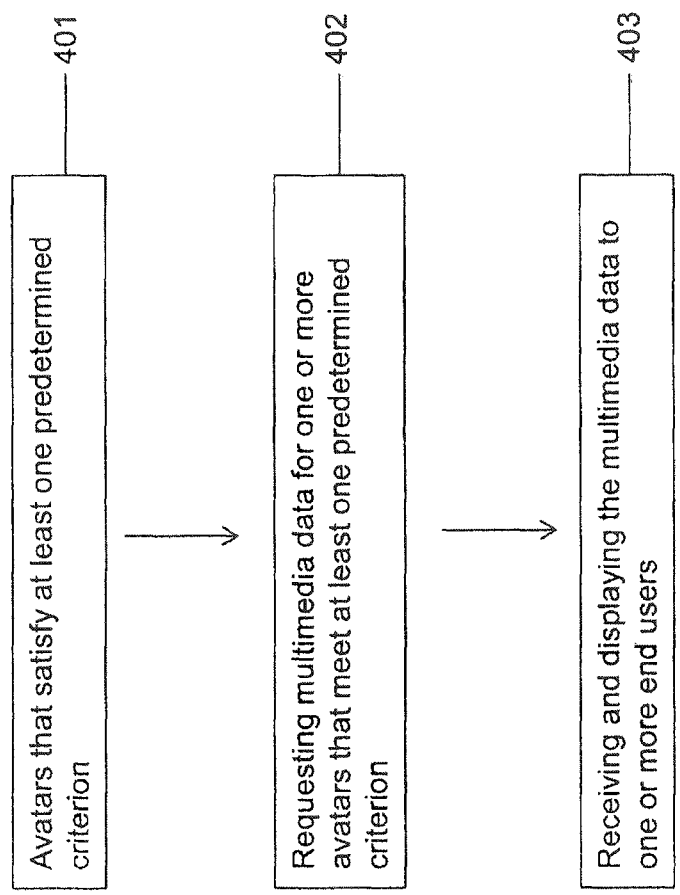
FIG. 4a is a flow chart that shows a general method of managing multimedia data in a virtual environment as implemented by a client.

FIG. 4a shows a method for managing multimedia data in a virtual environment. This method is ideally implemented on each individual client 202. The method comprises the steps of:

i. determining one or more avatars that satisfy at least one pre-determined criterion defined for an end user, at step 401;

ii. requesting multimedia data for the one or more avatars that meet the at least one predetermined criterion, at step 402; and iii. receiving and displaying the multimedia data to the end user, at step 403.

Figure 4B:
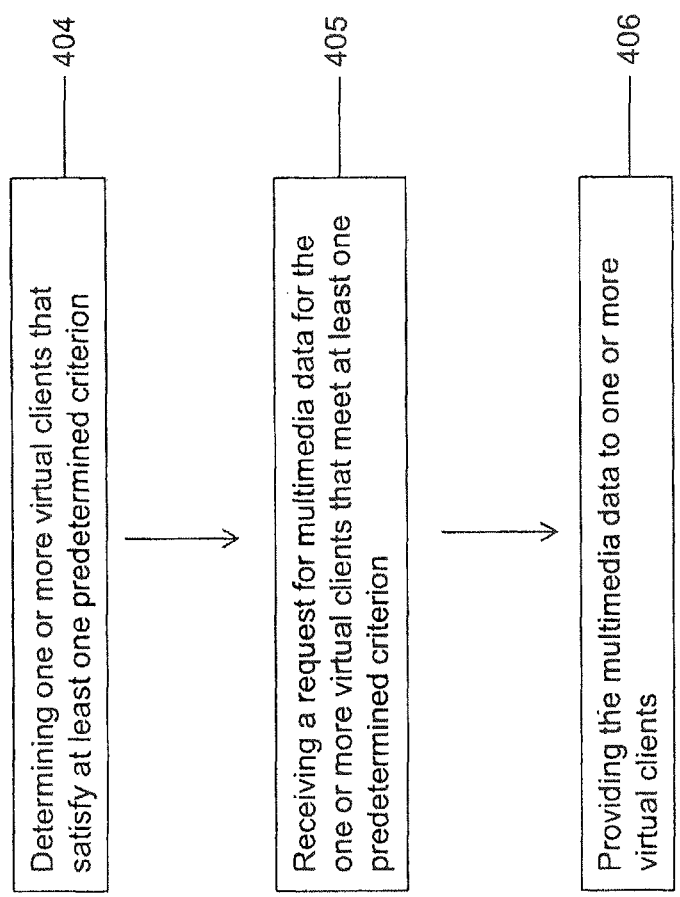
FIG. 4b is a flow chart that shows a general method of managing multimedia data in a virtual environment as implemented by a central server.

FIG. 4b shows another method for managing multimedia data in a virtual environment. This method may be implemented by the central server 201 or the media server 205. The method comprises the steps of:

i. determining one or more avatars that satisfy at least one predetermined criterion defined for an end user, at step 404;

ii. receiving a request for multimedia data for the one or more avatars that meet at least one pre-determined criterion, at step 405; and iii. providing the multimedia data to one or more end users, at step 406.

The pre-determined criterion specified in both methods may include at least one data culling technique applied to one or more of the avatars in the virtual environment. Possible data culling techniques include:

(a) a view field culling technique;
(b) a visibility culling technique;
(c) a back face culling technique; and/or
(d) an occlusion culling technique.

The view field culling technique includes defining a view field for each avatar. Each avatar 300 includes a view field which is defined in a coded set of rules. The rules regarding the size of the view field can be modified and altered by an authorised person such as an administrator. These rules may be stored on the database, or the central server 201 or the media server 205.

Figure 5:
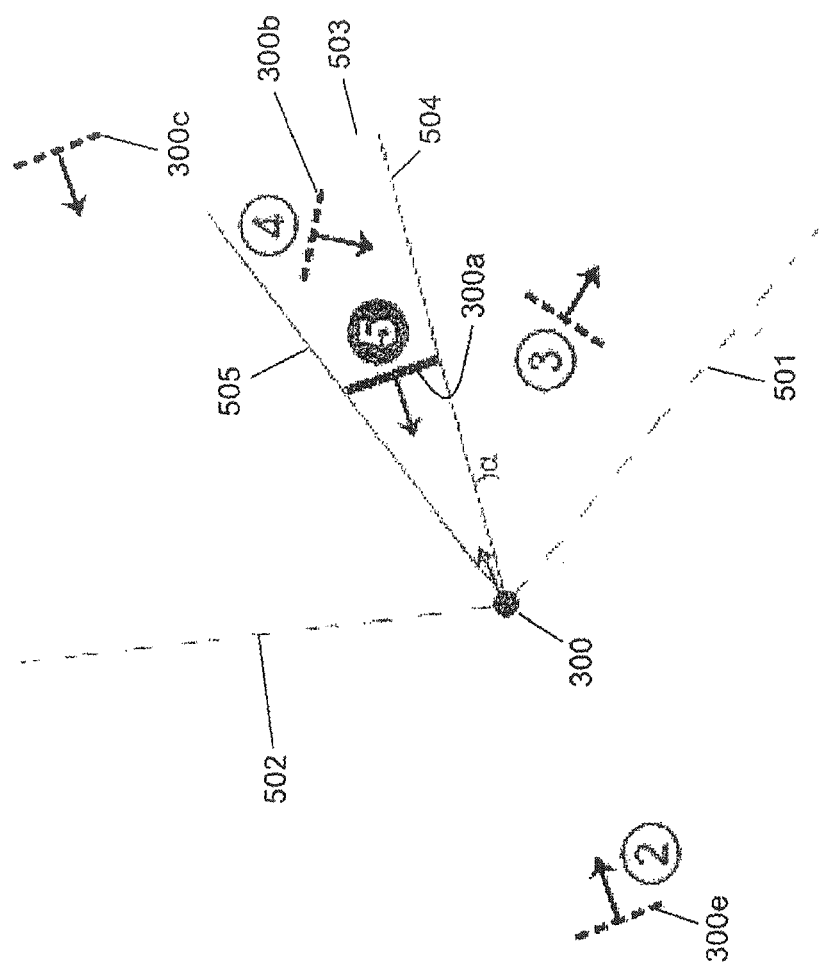
FIG. 5 shows an example view field of a avatar and shows other avatars in and out of the view field.
Figure 6:
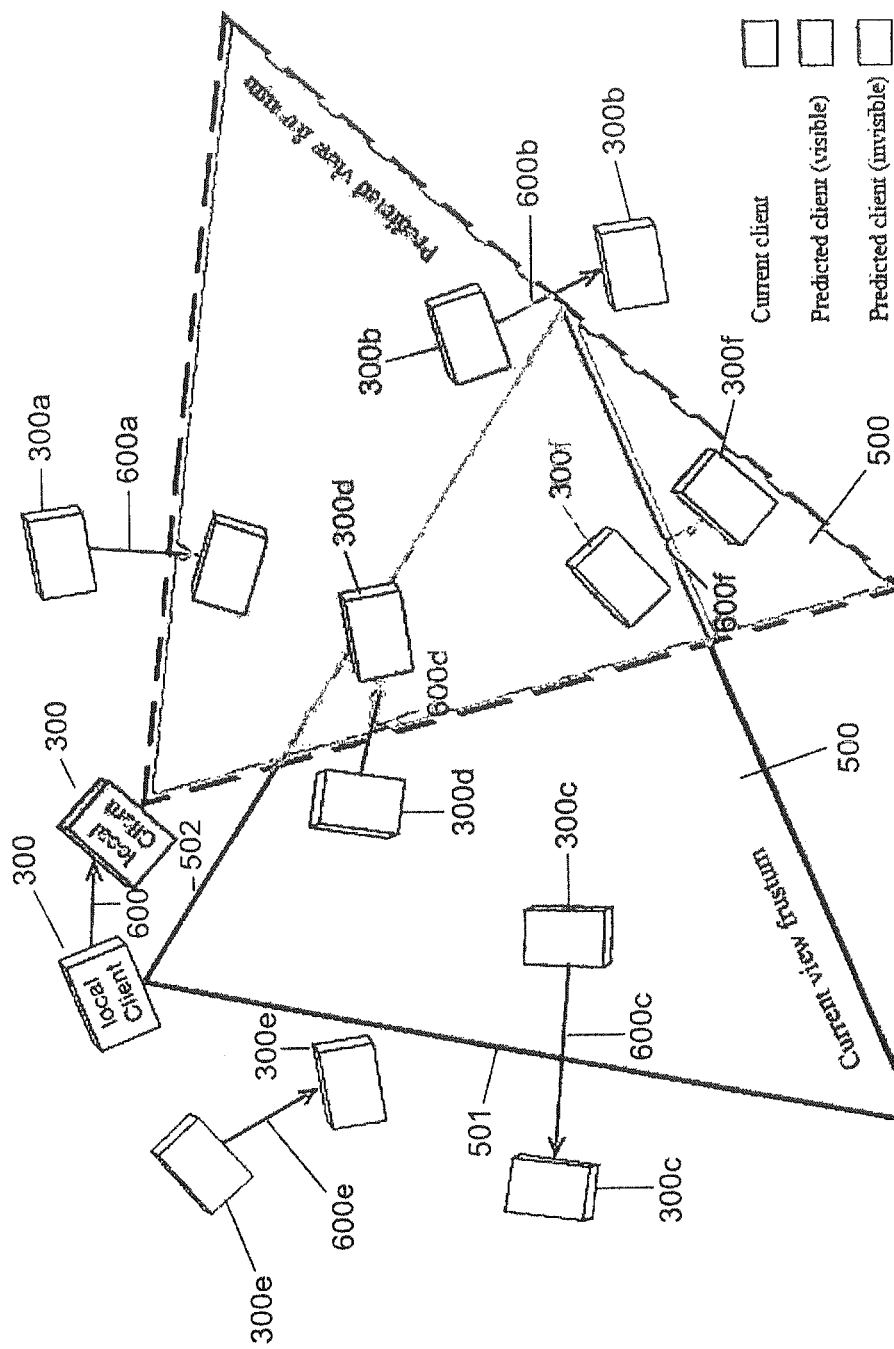
FIG. 6 shows the movement of avatars based on motion vectors and the movement of a avatars view field based on the motion of the avatar.

FIG. 5 shows an example of a view field of an avatar. The view field 500 can take any suitable geometric shape. The edges 501, 502 of the shape define the limits of the avatar's view field (which corresponds to the view of the virtual environment relayed to the respective end user). FIG. 6 shows a view field in the shape of a triangle (when viewed from above in two dimensions).

The view field may be any other suitable shape that extends outwardly from the avatars. For example, the view field may be a diverging shape originating at the avatar 300. The maximum visibility range is defined by the edge 503 of the view field.

In one form the central server 201 determines the location information of each one of the avatars in the virtual environment. The central server 201 may also determine the orientation of the avatars relative to the other avatars. The central server 201 can transmit this information to the clients such that the clients are aware of the location and orientation of the other avatars in the virtual environment. In an alternate form the individual clients may determine the orientation of other avatars within the virtual environment. The client may also determine the position of the other avatars within the virtual environment.

The view field culling technique includes the step of excluding or culling avatars that are outside the view field 500 of the local avatar. As seen in FIG. 5, avatars 300d and 300e are outside the view field 500, and hence the multimedia data from these avatars (300d, 300c) are not delivered to the client associated with the local avatar 300. This results in a reduction of total bandwidth usage due to a reduced amount of multimedia data being transmitted across the network 206.

The visibility culling technique includes the step of excluding all the avatars that are located beyond the maximum range of visibility. If an avatar 300c is outside the maximum visibility range of the local avatar 300, then the multimedia data for the avatar outside the visibility range is not delivered to the local avatar 300, reduces the total bandwidth requirement.

The back culling technique involves the step of excluding avatars that have their back facing the local avatar 300. The local avatar 300 uses orientation information to determine which avatars are facing away (i.e. the orientation of the other avatar relative to the local avatar). If another avatar (for example, avatar 300d) is facing away from the local avatar 300, then the video data of the back facing avatar is not required by the client associated with the local avatar 300. As seen from FIG. 5, avatar 300d is facing away from the avatar 300, hence the multimedia data of avatar 300d is not supplied to avatar 300, thereby reducing the bandwidth requirement across the network because less video data is being transmitted over the network.

The occlusion culling technique involves the step of determining which avatars are covered by other avatars from the perspective of a local avatar. If an avatar is fully occluded or partially occluded by an object within the virtual environment or another avatar, then video data for the occluded avatar is not delivered to the client associated with the local avatar. As can be seen from FIG. 5, the angle of the occlusion lines 504 and 505 (lines that emanate from the view point and extend to the extremities of the occluding avatar to define the 'shadow' created by the occluding avatar in the local avatar's view field) are calculated ($\alpha$ and $\beta$) for each avatar. The angle from $\alpha$ to $\beta$ is termed the avatar's blocking angle range. This angle defines the part of the local avatars view that is blocked due to another avatar being present in the view field. From the nearest avatar to the furthest avatar, an overlap test is applied to check if the blocking ranges of avatars result in any overlap within the total visible angle range of the local avatar. Each avatar's blocking angle range is first compared to the blocked area. If there is any overlap, then further testing needs to be done to determine avatar priority (based on proximity to is the local avatar), otherwise it is assumed that the avatar is visible. Finally, the angle range is added to the blocked area.

FIG. 5 shows that avatar 300b is completely occluded by avatar 300a. Since avatar 300b is occluded, the multimedia data of avatar 300b is not delivered to the client associated with avatar 300 because avatar 300 does not have a line of sight to avatar 300b in the virtual environment.

Applying these data culling techniques results in a reduction of the amount of data sent to each client and hence reduces the bandwidth requirements of the network. The data culling techniques only allows multimedia data of avatars that are "visible" to a local avatar to be sent to the corresponding client. The implementation of this data culling techniques simulates "real life" interaction in the virtual environment, meaning the local avatar does not see other avatars that are occluded (either by other avatars or objects within the virtual environment) facing away, or outside a defined field on view (such as behind the local avatar).

Each client may maintain a list of visible avatars and requests multimedia data relating to the visible avatars. The visible avatars are determined by applying one or more of the data culling techniques described earlier. In one form the client requests multimedia data for visible avatars from the central server 201. The central server 201 gathers multimedia data from all the avatars and only sends multimedia data for the identified visible avatars. In another form the client for a local avatar requests multimedia data from other clients that relate to visible avatars.

Due to the distributed nature of the system, delay is is inevitable and must be considered. There is a network delay associated with transmitting multimedia data once a client requests data for a list of visible avatars. This means that the list should be valid until the client associated with the local avatar receives the requested video streams. Otherwise, there may be a discrepancy between the desired view of the end user and the actual information received on the client.

As a solution, a conservative visible set is introduced, which not only contains the visible avatars at the current point in time but also the avatars that may become visible during the interval between sending a request and receiving the corresponding response. To construct this list a motion vector is derived for each avatar, which indicates the current speed and direction of the avatar. Based on the motion vector, the next position of a local avatar is predicted. At least one or more data culling techniques described earlier may then be applied based on the predicted position of the local avatar as well as the current position.

For instance, in FIG. 6, the local avatar 300 moves in the direction defined by the motion vector 600. The view field 500 of the avatar 300 also moves due to the motion of the avatar in the virtual environment. All the avatars within the virtual environment 204 are assigned a motion vector, for example 600a, 600b, 600c, etc. The motion vector may include a translational velocity component or a rotational velocity component or both translational and rotational velocity components. As seen from FIG. 6 avatar 300a is not visible, but the predicted position of avatar 300a is in the view frustum of the predicted position of the local avatar 300. Moreover, avatar 300b and 300c will exit out of the local avatar's view field 500 when the local avatar reaches the predicted position. Hence, the list of visible avatars should include avatar 300a, but not avatar 300b or avatar 300c.

Figure 7:
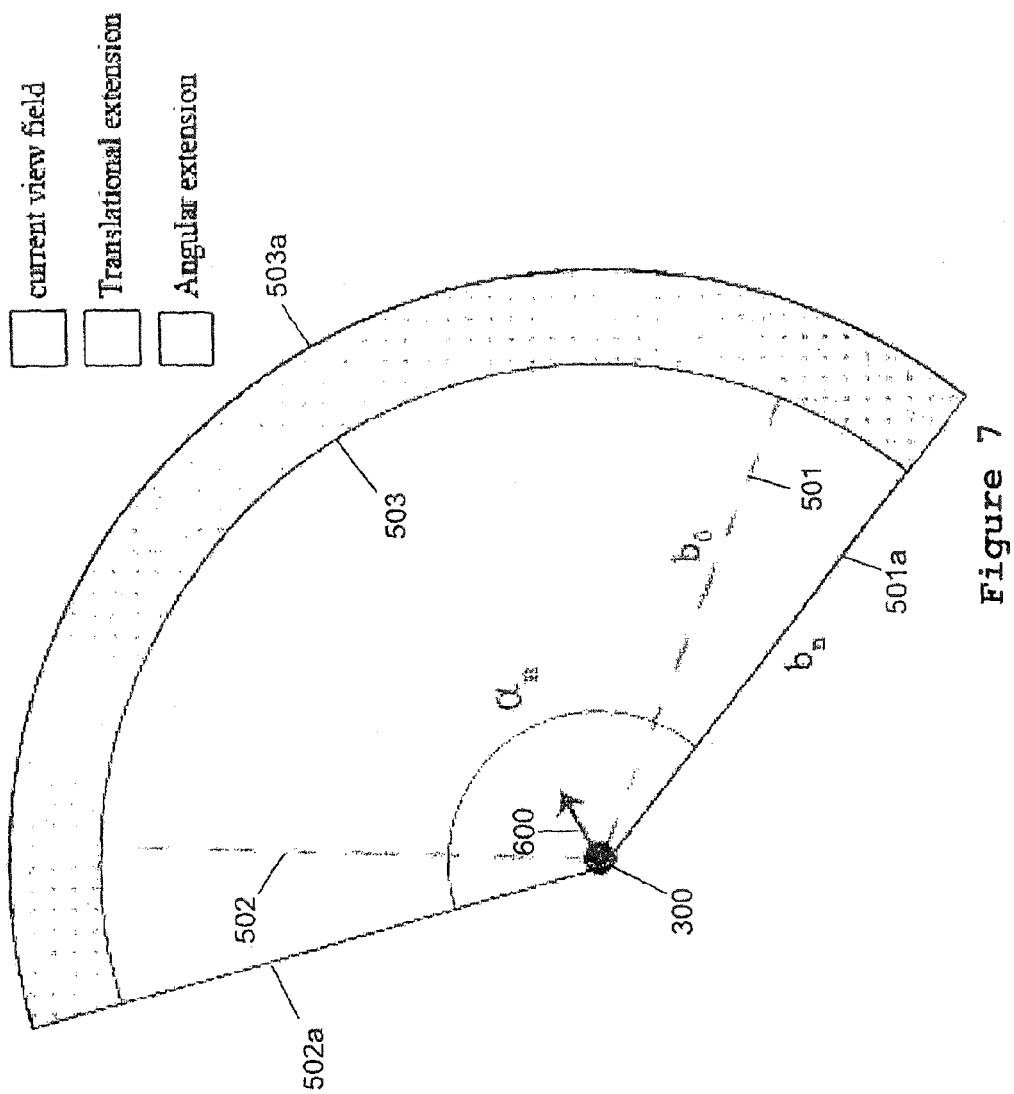
FIG. 7 shows a conservative view field of an avatar.

In order to compensate for the movement of the local avatar, the movement of the other avatars and network delay, a conservative view field is determined and utilised to perform the data culling techniques. The motion vector of the local avatar includes a translational and rotational component. FIG. 7 shows the conservative view field. The visible angle range is denoted $\alpha_0$ and the maximum visible distance is denoted $b_0$.

A conservative view field (CVF) is not only the view field at the current moment in time, but extended by all possible view fields during the network response interval. A CVF is constructed based on the maximum translation velocity ($v_{max}$), maximum angular velocity ($\omega_{max}$) and network delay ($t_d$) using the formula:

$$\alpha_n = \alpha_0 + (\omega_{max} \times t_d) \times 2 \quad (1)$$

$$b_n = b_0 + (v_{max} \times t_d) \quad (2)$$

Where: $\alpha_n$ is the visible angle range of a conservative view field (CVF),
$b_n$ is the maximum visible distance of a CVF,
$\omega_{max}$ is the maximum angular velocity,
$v_{max}$ is the maximum translation velocity, and
$t_d$ is the network delay.

The first formula (formula 1) is multiplied by two, because an avatar can either turn right or left and by this multiplication all possible future view fields are covered.

The predicted motions and locations of other avatars (based on the motion vectors of the respective avatars) are added to the virtual environment. By applying the data culling techniques described earlier, but using the larger view field (represented by the conservative view field), a conservative visible set is constructed. As can be seen from FIG. 7, the original view field was defined by 501, 502 and 503. The new conservative view field is defined by 501a, 502a and 503a. The extended view field is increased to compensate for the velocity (shown by vector 600) of the avatar 300.

Figure 8:
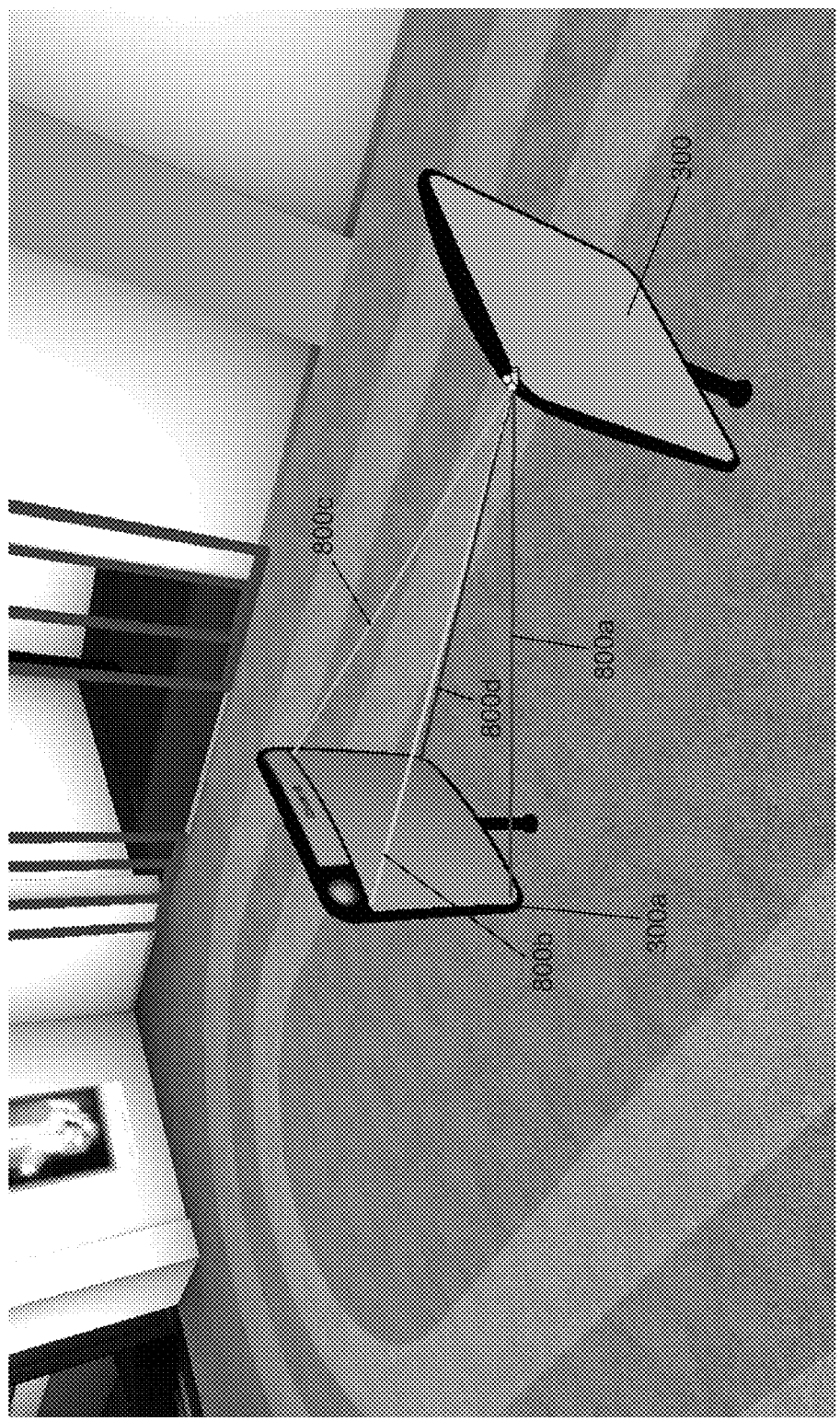
FIG. 8 shows a diagram for occlusion culling in 3D.

In another embodiment the occlusion culling test can be modified for 3D purposes. The proposed occlusion culling technique, as described above, is based on a technique called ray casting. However, when utilising the ray casting technique, the viewpoint is not the source of rays but the destination of them. An alternate form of ray casting, for an alternate form of occlusion culling, is shown in FIG. 8. In the alternate form of the occlusion culling technique, rays 800a, 800b, 800c and 800d are emitted toward the view point (camera 303) from each of the four corners of each avatar's video display 302. If all rays are intersected by objects, including other avatars or any static or dynamic opaque object forming part of the virtual environment, the avatar is occluded. Otherwise the avatar is visible (even if only one ray is received by the view point).

When an avatar is rotating away from the view point, the rays are not received and the avatar is not visible. Hence, this method covers occlusion culling and back face culling simultaneously and has the advantage that the system only needs to perform the occlusion culling technique instead of two data culling techniques such as back face culling and the occlusion culling described earlier with respect to FIG. 5. The reduced processing steps are advantageous since they allow for faster processing times.

Figure 16:
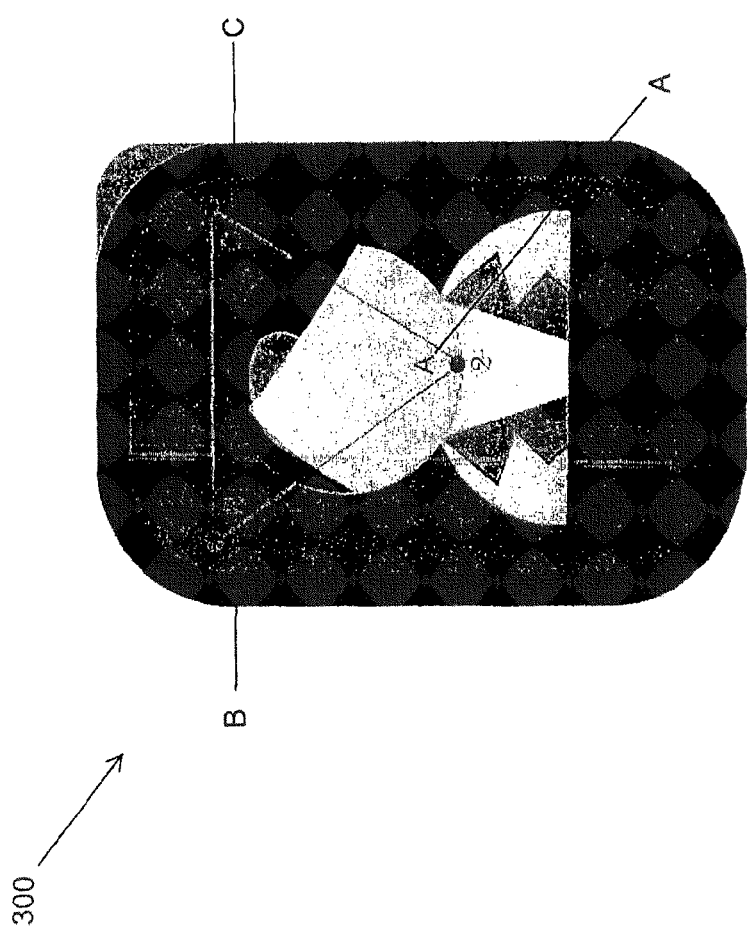
FIG. 16 is an alternate form of 3D occlusion culling.

An alternate form of 3D occlusion culling is shown in FIG. 16. In the illustrated form of occlusion culling, the source of rays from an avatar may form any arbitrary shape based on the content of the target avatars video stream. Each vertex can be given a weight, which shows the priority of the ray. For instance in FIG. 16, the sources of rays make a triangular shape for a talking head video. Vertex "A" has the highest priority (weight=2) and the two other vertices ("B", "C") both have a lower priority (weight=1).

Rays are emitted toward the view point in order of their priorities, for instance in this particular example, the first a ray is emitted and processed from vertex A. If the ray is not intersected by an object in the virtual environment, the avatar is considered fully visible and no other calculation is performed. This method minimises the processing cost.

To avoid incorrect detections of fully visible avatars, based on the characteristics of the virtual environment and the shapes of obstacles, the sources of rays can have different shapes and multiple vertices can share the same priority.

There is a trade-off between detection accuracy and computation cost. Nevertheless, this occlusion culling method provides a flexible solution that is capable of satisfying either criterion.

If the source or sources with the highest priority are intersected by objects, the other rays in order of their priorities are emitted and checked for the intersection. When a ray with a specific weight is received by the view point, all other sources of rays with the same weight or lower weights are discarded and never processed. If all rays from the actual avatar are blocked by objects, the rays from the corresponding shadow avatar are emitted in order of the priorities.

Based on the weight of the received rays from the view point, and the source of the rays (actual or shadow avatar), the avatar is categorised as one of the following:
Fully visible
Partially visible
Partially occluded
Fully occluded/facing away The spatial distance and angular state of all avatars are categorised as the first three categories (fully visible, partially visible, partially occluded) are calculated as mentioned in this specification.

The multimedia data of other avatars are delivered to the local client in differing quality. The quality is determined based on the mentioned categories, spatial distance and angular state of each client in the area of interest of the local client.

Figure 9:
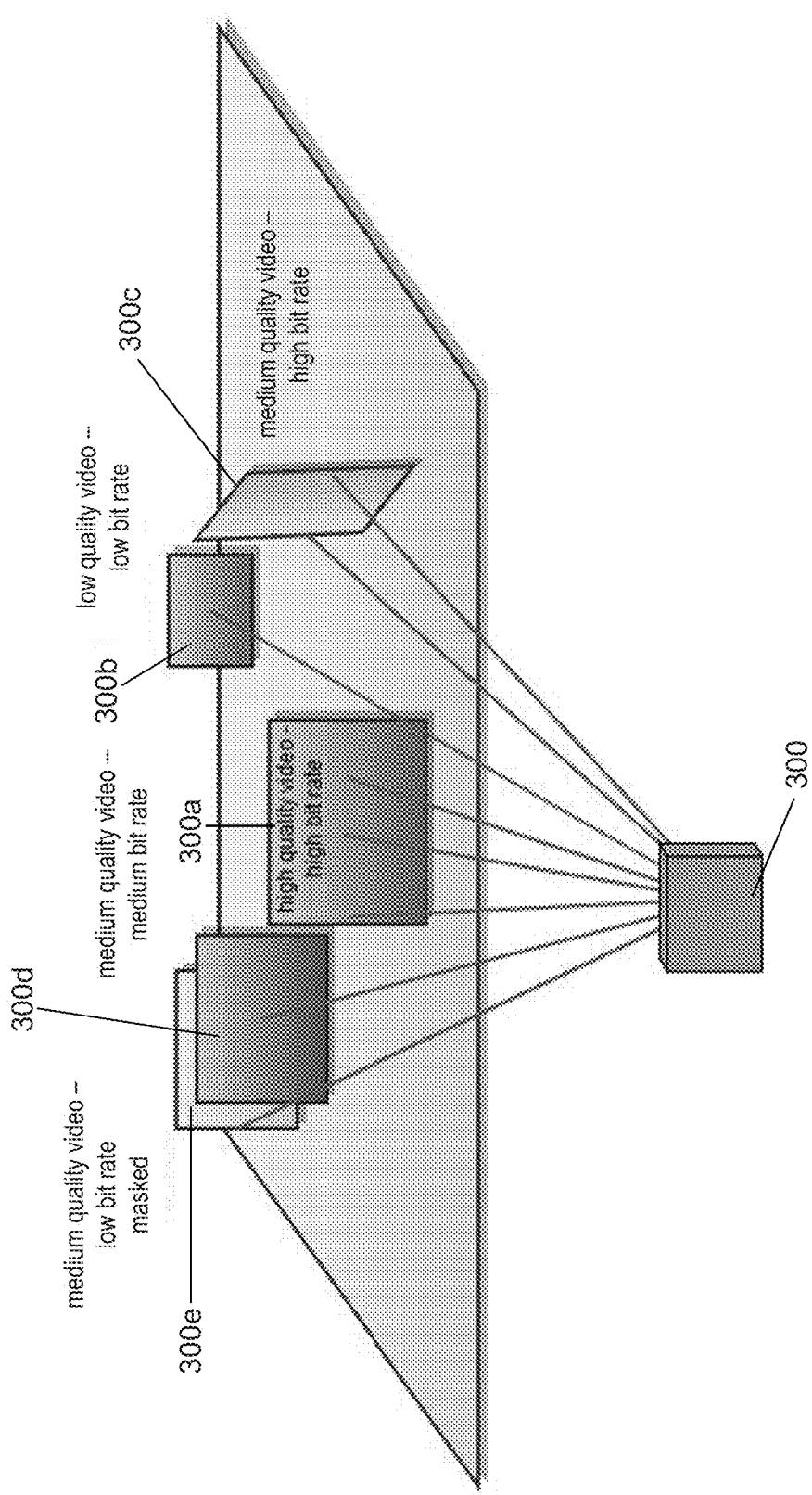
FIG. 9 shows a diagram of the varying quality of multimedia data based on the position and orientation of the other avatars.

In another embodiment, the multimedia data delivered to a client may be delivered in differing quality. The bandwidth usage of the system may be reduced by judiciously reducing the quality of video, both in terms of resolution (spatial quality) and frame rate (temporal quality), depending on the virtual distance to the local avatar. In other words, the quality of avatars' videos that are further away can be reduced without any significant perceptual impact on the viewer. FIG. 9 shows an embodiment of a local avatar 300 and other visible avatars 300a-300e. The visible avatars are determined after applying the data culling techniques and using position and orientation information of the avatars in the virtual environment. High quality multimedia data with a high bit rate is delivered for the avatars which are determined to be closest and visible to the local avatar 300, such, as avatar 300a, as shown in FIG. 9. A medium quality multimedia data is delivered for avatars that are at a medium distance and visible, for example avatars 300d, 300c. The bit rate for the multimedia data may differ depending on the orientation of the other avatars to the local avatar. Low quality multimedia data is supplied for avatars that are at a greater distance from the local avatar, for example at the edge of the visible range, such as avatar 300b from FIG. 9. The distance requirement for various quality of multimedia can be pre-set at the central server, or set by the local client or media server. The determination of which avatars are within which distance limits may be performed by the client. In another form this determination may be performed by the central server 201. In a further alternate form, the data quality determination may be performed by the media server 205. In one form the central server may condition the data stream from a client to the appropriate quality before delivering it to another client.

Figure 10:
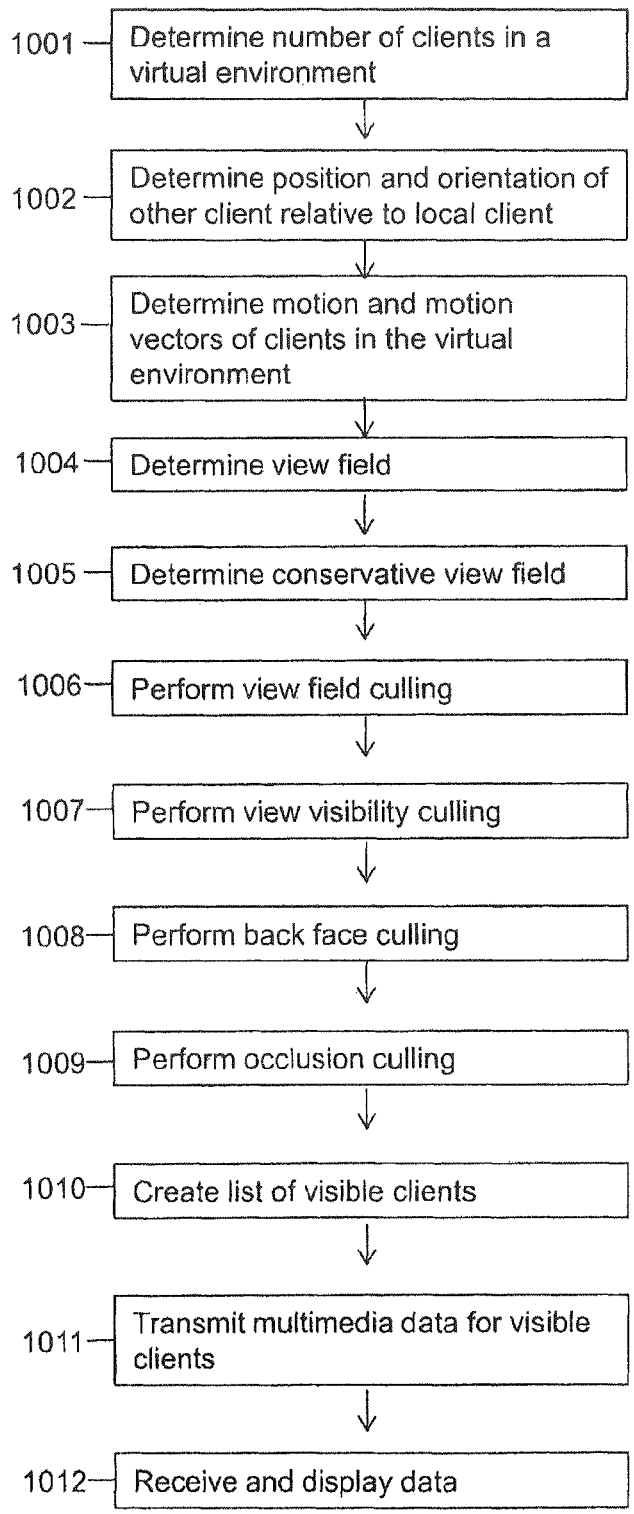
FIG. 10 is a flow chart that shows a method of managing multimedia data in a virtual environment as implemented by an avatar.

FIG. 10 shows a flow diagram of a method of managing multimedia data in a virtual environment. This method is implemented by the central server 201 to manage multimedia data transmitted to clients in the virtual environment. As seen from FIG. 10, at step 1001, the method involves determining the number of avatars in a virtual environment. At step 1002 the position and orientation of the other avatars relative to a local avatar are determined.

At step 1003 the motion vectors of the avatars in the virtual environment are determined. At step 1004 a view field of the local avatar is determined. At step 1005 a conservative view field is determined based on the motion of the local avatar.

At step 1006, the central server 201 performs the view field culling technique in which the server 201 checks for which other avatars are within the conservative view field of the local avatar. The avatars that are not within the view field are disregarded and multimedia data for these avatars is not transmitted to the client associated with the local avatar.

At step 1007 a visibility culling technique is applied, in which the server 201 determines which avatars are beyond the visible range of the local avatar. The avatars that fail the visibility culling criterion, as explained earlier, are excluded.

At step 1008, a back face culling technique is applied. The avatars that fail the back face culling criterion, as explained earlier, are excluded.

At step 1009 an occlusion culling technique is applied. The avatars that fail the occlusion culling criterion, as explained earlier, are excluded.

At step 1010 a list of visible avatars is created. The visible avatars are the avatars that meet the pre-determined criterion, meaning the avatars that pass one or more of the data culling techniques explained earlier.

At step 1011, the server 201 transmits multimedia data to the client corresponding to the local avatar for each avatars in the visible avatars list. At step 1012, the local client receives the data for the visible avatars and displays this data to an end user. As an optional extra step, once the visible list of avatars is generated, the server 201 may divide the avatars up by distance from the local avatar. The local client may then receive multimedia data of the varying quality depending on the distance the avatars are from the local avatar, within the virtual environment.

Figure 11:
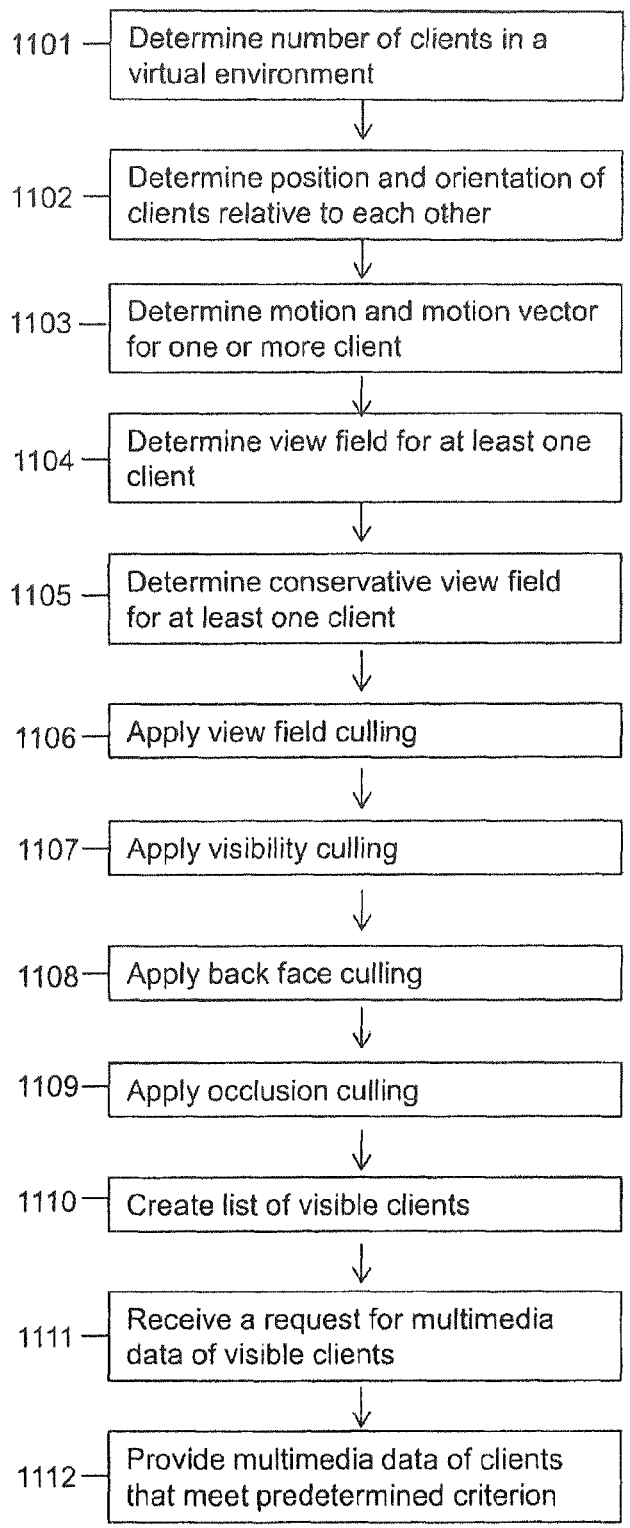
FIG. 11 is a flow chart that shows a method of managing multimedia data in a virtual environment as implemented by a central server.

FIG. 11 shows a flow diagram of another embodiment of a method for managing multimedia data in a virtual environment. This method is implemented by a central server 201 to manage multimedia data in a virtual environment. As seen from FIG. 11, at step 1101, the method involves determining the number of avatars in a virtual environment. At step 1102 the position and orientation of the avatars in the virtual environment is determined. The server 201 may also determine the position of the avatars relative to the other avatars in the environment.

At step 1103, the server 201 determines the motion vectors of the avatars in the virtual environment. At step 1104, a view field of at least one avatar is determined. At step 1105 a conservative view field of that avatar is determined based on the motion of the avatar and the relative motion of other avatars within the virtual environment. At step 1106, the central server may apply a view field culling technique in which the server determines which avatars are within the view field of at least one local avatar. The server may determine the avatars in the view field of the local avatar based on the view field constructed by the server. The avatars that are not within the view field are disregarded and multimedia data for these avatars is not transmitted to the client associated with the local avatar.

At step 1107, a visibility culling technique is applied. The avatars that do not meet the visibility culling criterion, as explained earlier, are excluded.

At step 1108, a back face culling technique is applied. The avatars that fail the back face culling criterion, as explained earlier, are excluded.

At step 1109, an occlusion culling technique is applied. The avatars that do not meet the occlusion culling criterion, as explained earlier, are excluded.

At step 1110, a list of visible avatars is created. The visible avatars are determined in relation to a local avatar. The visible avatars are avatars that meet the pre-determined criterion, meaning the avatars that pass the data one or more of the culling techniques explained earlier.

At step 1111, the central server 201 transmits multimedia data relating to the visible avatars in the visible avatar list. At step 1112, the central server 102 delivers the multimedia data of the clients that meet the predetermined criterion. As an optional extra step, once the visible list of avatars is generated, the central server 201 may deliver or send multimedia data of varying quality depending on the distance of the visible avatars from the local avatar for the corresponding client.

It should be understood that in the method for managing multimedia data, not all of the described data culling techniques are necessarily implemented. In alternate methods any one or any combination of data culling techniques may be utilised by the method. The server 201 may receive and process the multimedia data from each client (including determining what multimedia data each client receives) or direct distribution of multimedia data directly between clients after determining how the multimedia data should be distributed (based on the culling techniques). This may include the server simply generating a map of the virtual environment (that identifies the current position, orientation and movement vector of each avatar) and distributing the map to each of the corresponding clients. The clients can then process the information contained in the map from the perspective of the corresponding local avatar and request multimedia as necessary from other clients without the multimedia having to be routed through the central server 201 or media server 205.

Figure 12:
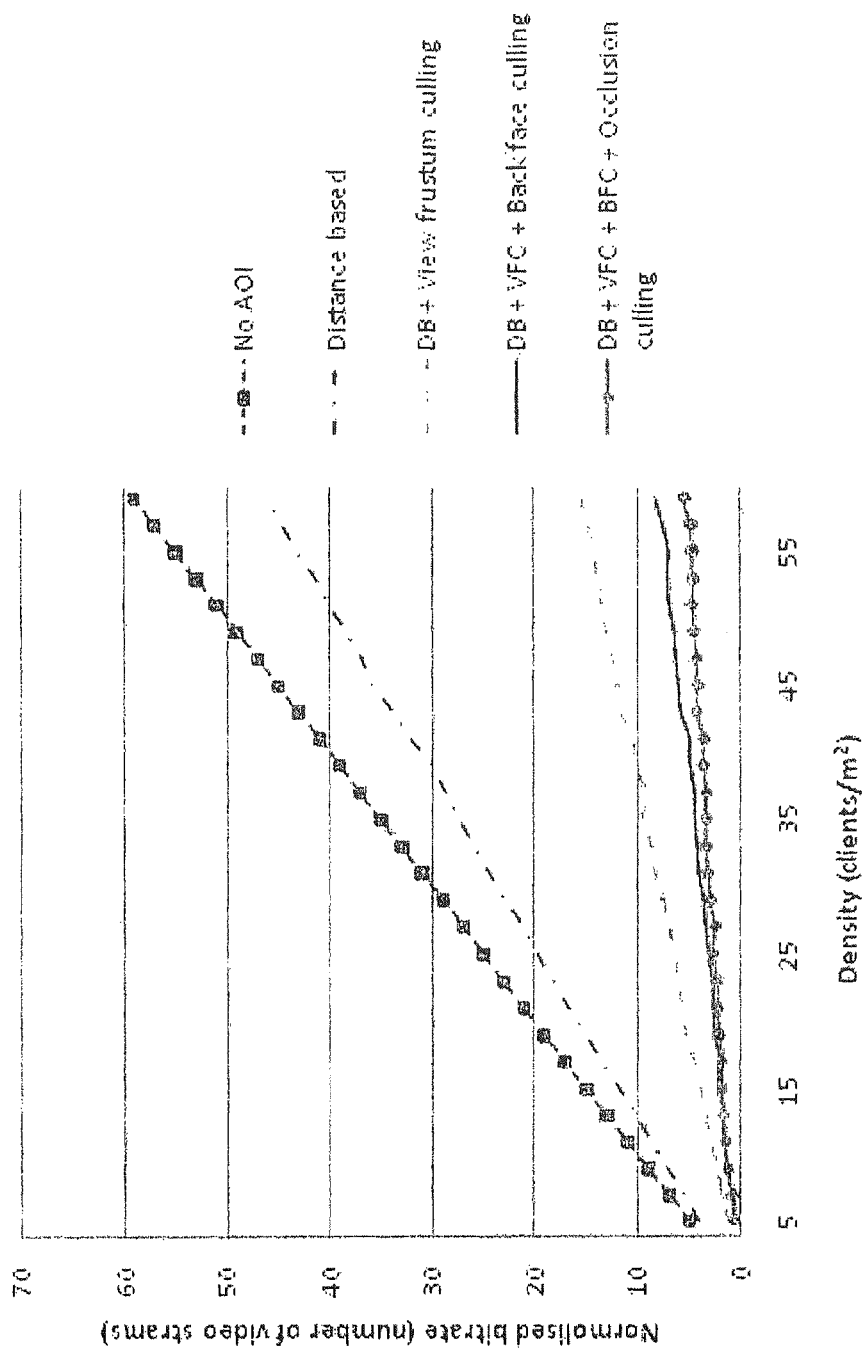
FIG. 12 shows a graph comparing the bit rates of multimedia data supplied when various data culling techniques are applied, the graph being related to a uniform distribution of avatars in an environment.

FIG. 12 shows a graph of the bit rate supplied to a client for a variety of avatar densities in a virtual environment, in particular demonstrating the effect of applying data culling techniques to manage the multimedia data provided to the clients. In one example, 60 avatars are distributed throughout a virtual environment. In one form, the avatars may be uniformly distributed throughout the environment. The graph shows that the total bit rate increases linearly when there is no data culling techniques (or predetermined filtering criterion). Hence multimedia data for every avatar in the environment is distributed to each client. This is shown by the graph labelled "no AOI", in which the bit rate increases linearly in relation to the number of avatars in the virtual environment. By applying a visibility culling technique where avatars are tested for presence within the visible range of a local avatar, a bandwidth saving of approximately 22% is achieved. This is shown in the graph of FIG. 12 by the graph labelled "distance based".

A significant bandwidth saving is achieved by applying a view field culling technique and culling avatars that are not within the view field in addition to the visibility culling technique applied previously. The corresponding band width is demonstrated by the graph labelled DB+view frustum culling in FIG. 12.

Addition of back face culling helps to save up to 86% bandwidth when compared to instances with no data culling techniques (illustrated by the graph labelled "no AOI"), by avoiding the transmission of the multimedia data of avatars that are located in the viewing frustum but facing away from the local avatar. This is shown by the graph labelled "DB+VFC+Back face culling".

After adding the occlusion culling method, the bandwidth saving reaches 90.61% when there are 60 avatars in the environment. This is shown by the final graph labelled "DB+VFC+BFC+Occlusion culling".

Figure 13:
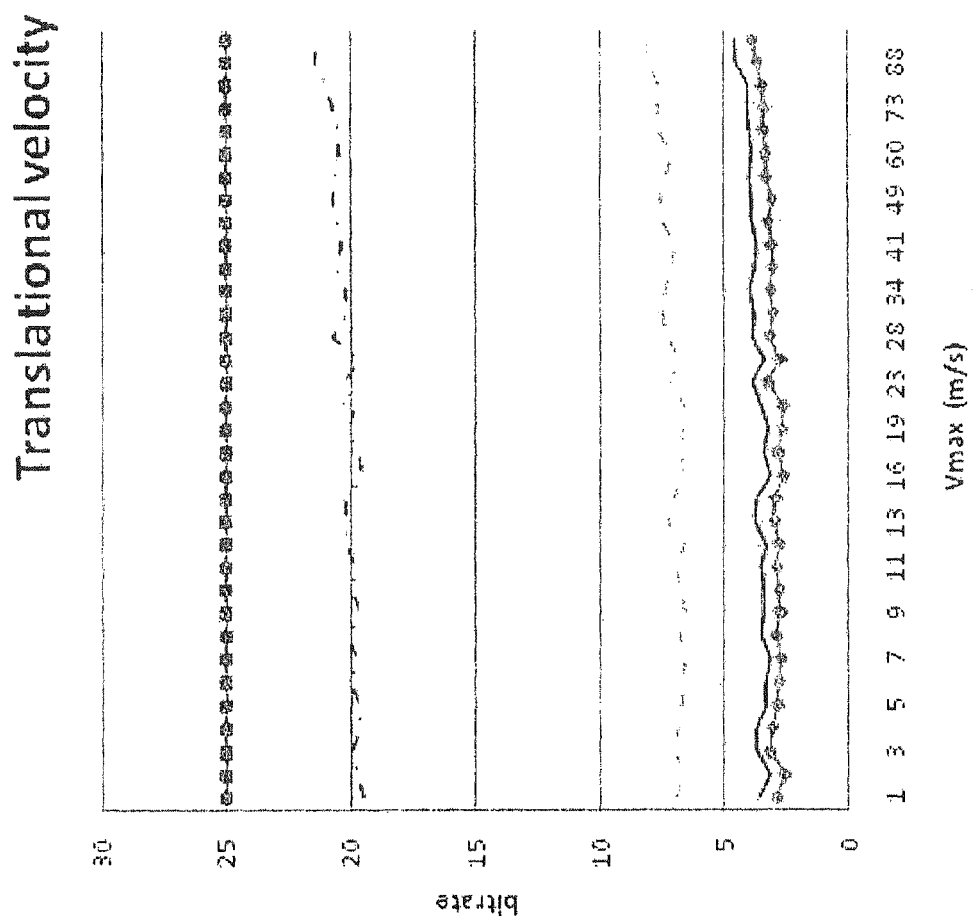
FIG. 13 shows a graph that illustrates the effect of adding a translation velocity component and how that affects bit rate of multimedia data.

FIG. 13 shows a graph of the effect of introducing a translational velocity component to the multimedia filtering system and the prediction of avatar locations after a specified delay (approximately equal to the network delay).

It is assumed that the avatars only move in the direction that they are orientated and that no sidestepping is possible. The simulated orientation and velocity of the avatars is completely random. The graph shows the reduction in bit rate after more data culling techniques are applied. The graph shows that the highest bit rate exists when no data culling technique are applied. The maximum reduction in bit rate occurs when view field culling, visibility culling (i.e. distance based culling), back face culling and occlusion culling techniques are all applied in combination.

Figure 14:
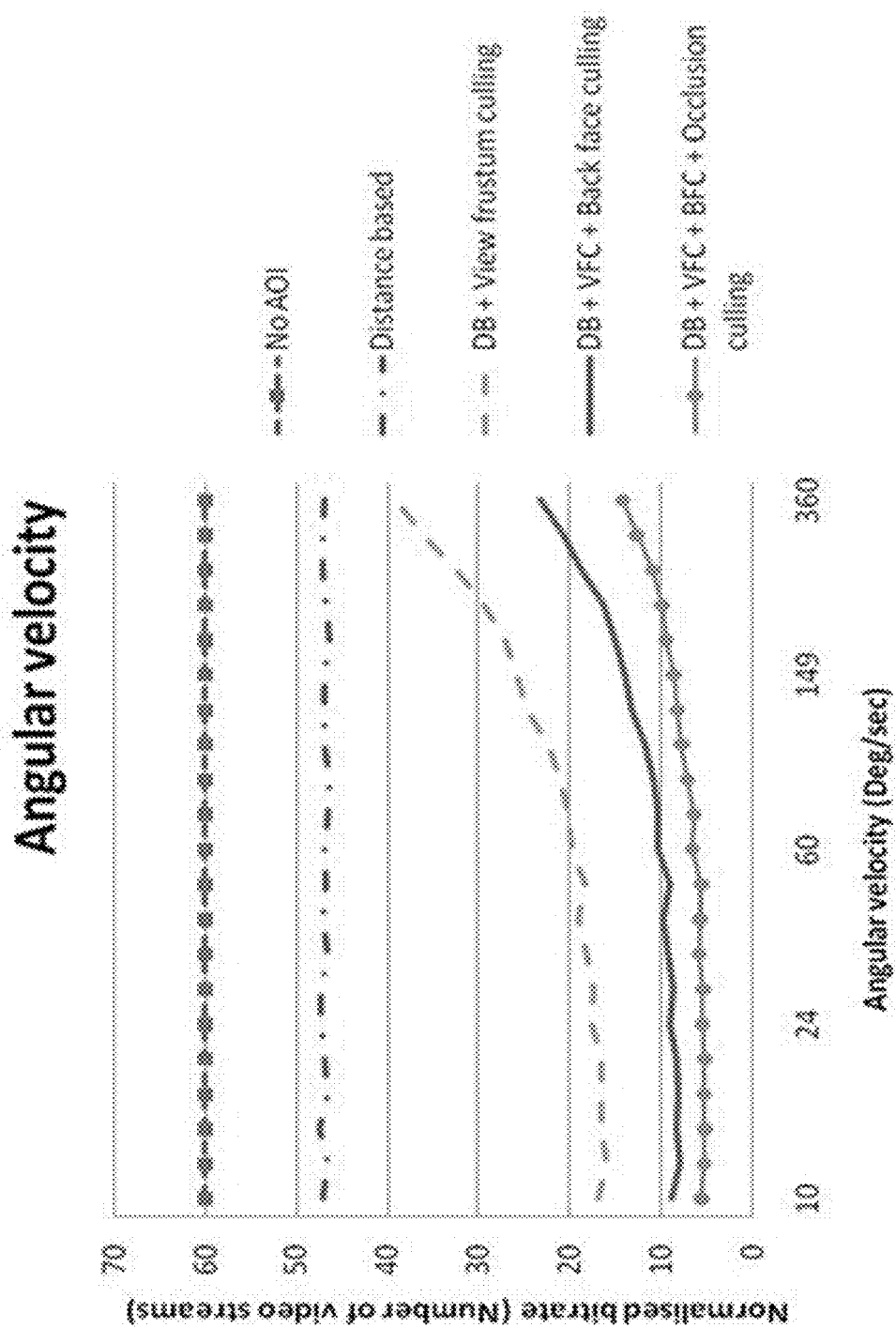
FIG. 14 shows a graph that illustrates the effect of adding a rotational velocity component and how that affects bit rate of multimedia data.

FIG. 14 shows a graph of the impact of angular velocity on the multimedia filtering system. The graph in FIG. 14 shows that the view field culling, back face culling and occlusion culling techniques are all affected by the angular velocity component. This is shown in FIG. 14 by the increase in bit rate in the respective graphs as the angular velocity increases.

Figure 15:
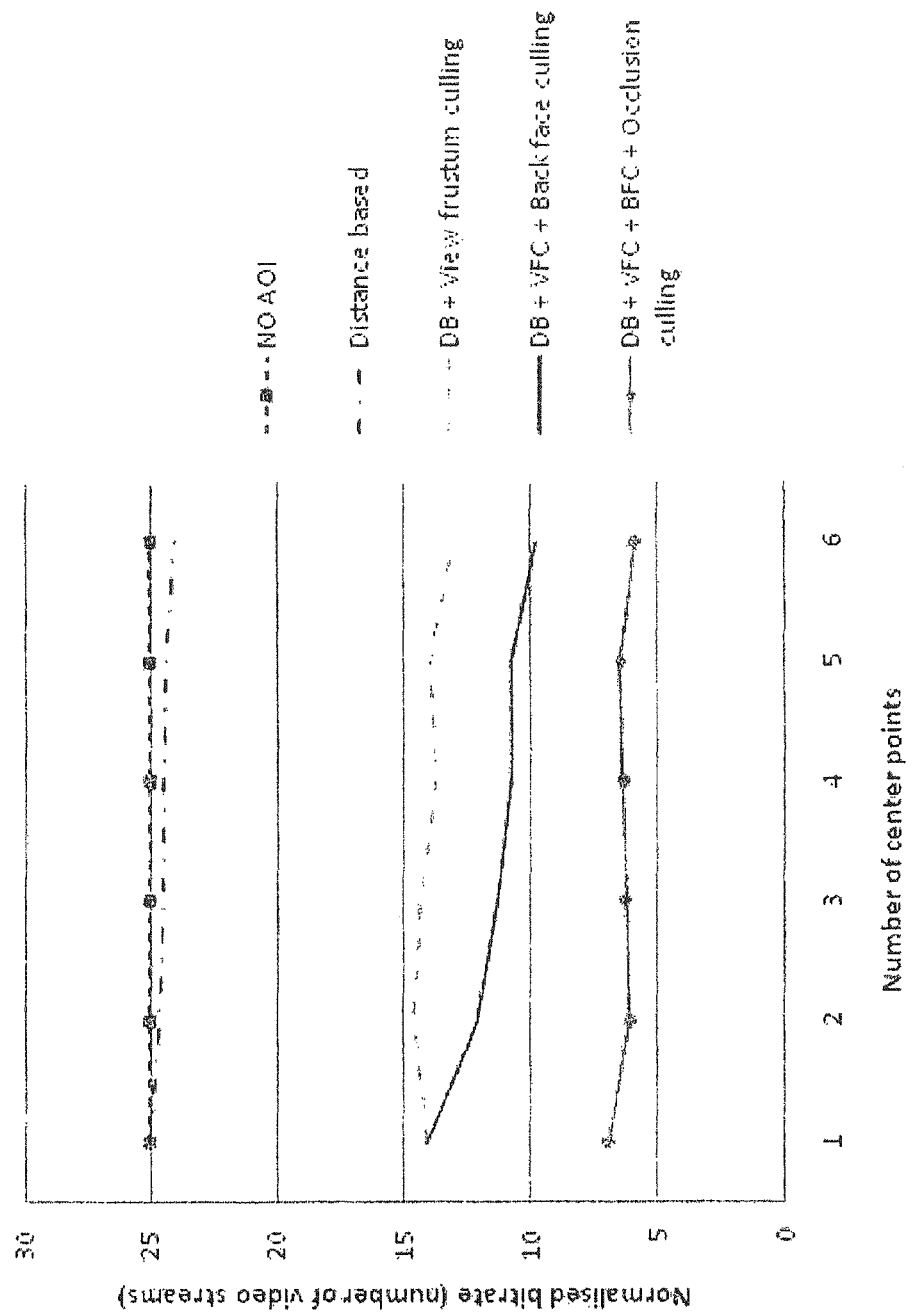
FIG. 15 shows a graph comparing the bit rates of multimedia data supplied for a clustered distribution of avatars and the difference in bit rates for various data culling techniques.

The graph in FIG. 15 is a graph of a realistic scenario in which the avatars are in a clustered distribution (the previous graphs were produced with the avatars arranged in a normal distribution). The graph in FIG. 15 shows the reduction in bit rate when there is a clustered distribution of avatars and the translational and angular velocity components for all the avatars are introduced into the system. As can be seen, the highest bit rate occurs when there is no data culling. The lowest bit rate occurs when all data culling techniques are applied.

It should be understood the methods and order of applying various data culling techniques described in this specification are exemplary embodiments. It is envisaged that any number of data culling techniques described could be applied in any order, and the specification is not limited to a specific number or application order. It should be understood the applicant has devised a method and system for managing multimedia data in a virtual environment using predetermined criterion which is the application of data culling techniques.

Although not required, the embodiments described with reference to the Figures can be implemented as an application programming interface (API) or as a series of libraries for use by a developer or can be included within another software application, such as a terminal or personal computer operating system or a portable computing device operating system. Generally, as program modules so include routines, programs, objects, components and data files assisting in the performance of particular functions, the skilled person will understand that the functionality of the software application may be distributed across a number of routines, objects or is components to achieve the same functionality desired herein.

It will also be appreciated that where the methods and systems of the present invention are either wholly implemented by computing systems or partly implemented by computing systems then any appropriate computing system architecture may be utilised. This will include standalone computers, network computers tablet computers, mobile phones, dedicated hardware devices and virtual machines. Where the terms "computing system" and "computing device" are used, these terms are intended to cover any appropriate arrangement of computer hardware capable of implementing the function described.

The invention claimed is:

1. A computer-implemented method for dynamically creating multimedia data streams for display on at least one client comprising one or more graphical user interfaces, the method comprising:

establishing a multiparty conference between a plurality of clients by creating data connections between a plurality of clients and at least one server, each client and server comprising a processor;

at a processor, generating virtual environment video data representing a virtual environment, the virtual environment video data including data representing, a 3D virtual environment, a plurality of avatars in the virtual environment, each avatar being associated with a client in the multiparty conference;

at at least one server or at at least one client, receiving a user video data stream from at least one client in the multiparty conference the user video data stream representing a video image of a user associated with at least one client in the multiparty conference;

at the at least one server or the at least one client, receiving from at least one client user input positional data representing the position and orientation of the avatar corresponding to the at least one client within the virtual environment and, transmitting the user input positional data to at least one client in the conference;

at a first client:
- using the position and orientation of the avatar associated with the first client within the virtual environment to calculate a virtual field for view of the avatar within the virtual environment;
- receiving the transmitted positional data for at least one further client in the conference;
- using the received positional data to determine the visibility of at least one avatar within the virtual environment associated with the at least one further client;
- dynamically generating a first media data stream for the first client, the first media data stream identifying visibility of avatars within the field of view; and
- transmitting the first media data stream to the at least one server or the at least one client;

at the at least one server or the at least one client, transmitting adjusted user video data streams based on the media data to the first client associated with the identified visible avatars; and at the at least one client, receiving the user video data streams and creating a multimedia data stream representing the virtual environment by combining the avatar video data streams with the virtual environment video data.

2. The method of claim 1 comprising constructing the multimedia data stream for each avatar from a plurality of data culling techniques that are used to define an avatar's line-of-sight.

3. The method of claim 1 comprising calculating a virtual field of view an avatar's line-of-sight by applying any one or more of:
 (a) a back face culling technique;
 (b) a view field culling technique;
 (c) a visibility culling technique; and
 (d) an occlusion culling technique.

4. The method of claim 1 comprising determining a virtual distance between avatars within the virtual environment and moderating the reproduction of an avatar's video stream in the media stream associated with another avatar based on the proximity of the respective avatars within the virtual environment.

5. The method of claim 4 comprising reducing the bit rate and/or frame rate of the reproduced video stream in dependence on the distance between the avatars.

6. The method of claim 1 comprising generating a virtual display screen that displays images sourced from a client associated with an avatar within the virtual environment, the virtual display screen being visible within the virtual environment.

7. The method of claim 1, wherein the virtual environment is a three-dimensional virtual environment that permits users move their avatars within the virtual environment, wherein the media stream for each avatar displays a field of view of the avatar along the line of sight for the avatar, wherein the field of view includes other avatars selected based on the position of the avatar relative to the other avatars within the three-dimensional environment.

8. The method of claim 1, wherein the video stream that an avatar displays is a live video feed, captured by a camera, that includes video showing the user corresponding to the avatar.

9. A networking system comprising:
a computing apparatus configured to host a virtual environment, the computing apparatus being connected to a data network,
the computing apparatus further configured to:
- generate virtual environment video data representing a virtual environment, the virtual environment video data including data representing a three dimensional virtual environment, a plurality of avatars in the virtual environment, each avatar being associated with a client in a multiparty conference;
- receive a user video data stream from at least one client in the multiparty conference the user video stream representing a video image of a user associated with at least one client in the multiparty conference;
- receive from at least one client user input positional data representing the position and orientation of the avatar corresponding to at least one client in the multiparty conference;
- transmit the user input positional data to at least one client in the conference;
- receive a media data stream identifying visibility of avatars within a virtual field of view of an avatar associated with a client;
- generate an adjusted user video data stream based on the media data stream; and
- transmit the adjusted video data stream to the client.

10. The system of claim 9 wherein the computing apparatus is configured to direct the transmission of the video stream associated with each avatar based on the line-of-sight determined for the corresponding avatar, the video stream being transmitted directly between clients associated with the avatars.

11. The system of claim 9 wherein the computing apparatus is configured to receive a video stream from a client associated with each avatar and relay the media stream for each avatar to a corresponding user based on the line-of-sight of the avatar.

12. The system of claim 9 wherein the computing apparatus implements a plurality of data culling techniques to define an avatar's line-of-sight.

13. The system of claim 9 wherein the computing apparatus is configured to determine an avatar's line-of-sight by applying any one or more of:
 (a) a back face culling technique;
 (b) a view field culling technique;
 (c) a visibility culling technique; and
 (d) an occlusion culling technique.

14. The system of claim 9 wherein the computing apparatus is configured to determine a virtual distance between avatars within the virtual environment and moderate the reproduction of an avatar's video stream in the media stream associated with another avatar based on the proximity of the respective avatars within the virtual environment.

15. The system of claim 14 wherein the computing apparatus is configured to reduce the bit rate and/or frame rate of the reproduced video stream for distant avatars.

16. The system of claim 9 wherein the computing apparatus is configured to generate a virtual display screen that displays images sourced from a client associated with an avatar within the virtual environment, the virtual display screen being visible within the virtual environment.

17. A computer-implemented method for dynamically creating multimedia data streams for display on at least one client comprising one or more graphical user interfaces, the method comprising:

establishing, at at least one server, a multiparty conference between a plurality of clients, the plurality of clients each having a data connection with the at least one server, each client and the at least one server comprising a processor, wherein each of the clients in the multiparty conference is associated with an avatar in a 3D virtual environment of the multiparty conference;

identifying, at the at least one server, a plurality of avatars within the 3D virtual environment, each avatar representing a corresponding user at an associated client having a data connection with the at least one server;

selecting, at the at least one server, an avatar from the plurality of avatars;

determining, at the at least one server, a view point for the selected avatar within the 3D virtual environment of the multiparty conference and a view field for the selected avatar within the 3D virtual environment of the multiparty conference;

determining, at the at least one server, one or more avatars that satisfy at least one pre-determined criterion using the determined view point of the selected avatar and the determined view field of the selected avatar;

requesting, at the at least one server, multimedia data for the one or more avatars that meet the at least one pre-determined criterion, the multimedia data being requested from the clients associated with the one or more avatars that meet the at least one pre-determined criterion;

receiving, at the at least one server, the requested multimedia data for the one or more avatars that meet the at least one pre-determined criterion from the clients associated with the one or more avatars that meet the at least one pre-determined criterion; and providing, at the at least one server, the received multimedia data to a client associated with the selected avatar for display to a user during the multiparty conference.

18. The method as claimed in claim 17 wherein the method includes the further step of applying at least one data culling technique to the requested multimedia data.

19. The method as claimed in claim 18 wherein the data culling technique may be one or more of:
(a) a back face culling technique;
(b) view field culling technique;
(c) a visibility culling technique; and
(d) an occlusion culling technique.

20. The method as claimed in claim 18 wherein the view field culling technique includes determining whether the one or more clients reside within a view field within the virtual environment.

\* \* \* \* \*